(12) United States Patent
Urano et al.

(10) Patent No.: US 11,077,691 B2
(45) Date of Patent: *Aug. 3, 2021

(54) METHOD FOR PRODUCING PRINTED MATTER

(71) Applicant: RISO KAGAKU CORPORATION, Tokyo (JP)

(72) Inventors: Yuki Urano, Ibaraki (JP); Akiko Hayashi, Ibaraki (JP); Mamoru Fukuda, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,591

(22) Filed: Feb. 27, 2020

(65) Prior Publication Data

US 2020/0276849 A1   Sep. 3, 2020

(30) Foreign Application Priority Data

Feb. 28, 2019  (JP) .............................. JP2019-035328
Feb. 28, 2019  (JP) .............................. JP2019-036234

(51) Int. Cl.
*B41M 5/00* (2006.01)
*B41J 2/21* (2006.01)
(Continued)

(52) U.S. Cl.
CPC .......... *B41M 5/0017* (2013.01); *B41J 2/2107* (2013.01); *C09D 11/322* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055;
(Continued)

(56) References Cited

U.S. PATENT DOCUMENTS

| 9,902,833 B2 | 2/2018 | Sugiyama et al. | |
| 2007/0067928 A1* | 3/2007 | Ellis | C09D 11/322 8/445 |
| 2011/0102497 A1* | 5/2011 | Sato | D06P 5/30 347/21 |
| 2011/0200751 A1* | 8/2011 | Yatake | D06P 1/6735 427/261 |

(Continued)

FOREIGN PATENT DOCUMENTS

| JP | 2003-055886 | 2/2003 |
| JP | 2006-132034 | 5/2006 |

(Continued)

OTHER PUBLICATIONS

U.S. Appl. No. 16/803,618, filed Feb. 27, 2020.

*Primary Examiner* — Manish S Shah
(74) *Attorney, Agent, or Firm* — Hamre, Schumann, Mueller & Larson, P.C.

(57) ABSTRACT

A method for producing printed matter is disclosed that includes applying a pretreatment liquid containing a resin and a pretreatment liquid containing a coagulant to a substrate, and after the applying of these pretreatment liquids, applying an aqueous inkjet ink to the substrate using an inkjet system.

19 Claims, 3 Drawing Sheets

(51) Int. Cl.
*C09D 11/38* (2014.01)
*C09D 11/322* (2014.01)

(58) Field of Classification Search
CPC .......... B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS

| | | | |
|---|---|---|---|
| 2011/0279517 A1* | 11/2011 | Katsuragi | B41J 2/2114 347/21 |
| 2015/0054885 A1* | 2/2015 | Sugiyama | D06P 1/5292 347/21 |
| 2015/0217576 A1* | 8/2015 | Yatake | B41J 3/4078 347/21 |

FOREIGN PATENT DOCUMENTS

| | | |
|---|---|---|
| JP | 2009-154312 | 7/2009 |
| JP | 2010-150453 | 7/2010 |
| JP | 2011-168912 | 9/2011 |
| JP | 2015-161043 | 9/2015 |
| JP | 2017-094672 | 6/2017 |

* cited by examiner

METHOD FOR PRODUCING PRINTED MATTER

CROSS REFERENCE TO RELATED APPLICATIONS

This application is based upon and claims the benefit of priority from the prior Japanese Patent Application No. 2019-036234, filed on Feb. 28, 2019, the entire contents of which are incorporated by reference herein, and the prior Japanese Patent Application No. 2019-035328, filed on Feb. 28, 2019, the entire contents of which are incorporated by reference herein.

BACKGROUND OF THE INVENTION

Field of the Invention

Embodiments of the present invention relate to a method for producing printed matter.

Description of the Related Art

The inkjet recording method is a method in which an inkjet ink of high fluidity is jetted from fine nozzles in the form of liquid droplets, thereby recording an image on a substrate positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent.

Because aqueous inks use water as the main solvent, they have little impact on the environment, and because the solvent volatilizes readily, the produced printed matter exhibits excellent drying properties. On the other hand, depending on the type of substrate used, aqueous inks can sometimes lack satisfactory permeability into the substrate, and the degree of image fixability can sometimes leave room for improvement.

JP 2017-94672 A discloses a liquid jetting method in which a medium is coated with a pretreatment liquid and an ink is then jetted onto the medium, wherein by changing the order in which a plurality of pretreatment liquids of different permeability are overlaid, in accordance with the type of medium, the permeability and wet spreadability of the pretreatment liquid can be stabilized regardless of the characteristics of the medium, and the wet spreadability of the pretreatment liquid can be improved while enhancing the reactivity between the pretreatment liquid and the ink.

JP 2017-94672 A discloses that a first pretreatment liquid and a second pretreatment liquid each contain a solution component and a reactive component such as a coagulant, wherein the reactive components in the first pretreatment liquid and the second pretreatment liquid are the same, but the permeability differs between the two pretreatment liquids.

Further, inkjet printing using aqueous pigment inks is used, for example, as a method for simply printing to a fabric. However, pigments generally tend to exhibit inferior color development to dyes.

Methods for improving the color development using a pretreatment liquid containing a pigment coagulant have been proposed as methods for improving the color development in textile printing using aqueous pigment inks (see JP 2003-55886 A, JP 2006-132034 A, and JP 2015-161043 A).

SUMMARY OF THE INVENTION

Some embodiments of the present invention provide a method for producing printed matter that includes applying a pretreatment liquid containing a resin and a pretreatment liquid containing a coagulant to a substrate, and, after the applying of the pretreatment liquids, applying an aqueous inkjet ink to the substrate using an inkjet system.

One embodiment of the present invention provides a method for producing printed matter that includes applying a pretreatment liquid A containing a resin and a pretreatment liquid B containing a coagulant to a substrate, each using an inkjet system, and, after the applying of the pretreatment liquid A and the pretreatment liquid B, applying an aqueous inkjet ink to the substrate using an inkjet system. It is preferable that the pretreatment liquid A and the pretreatment liquid B are jetted so as to land on the substrate in a fixed order. It is preferable that for the pretreatment liquid that lands on the substrate first among the pretreatment liquid A and the pretreatment liquid B, at least one of the landing time difference $\Delta T_X$ between the two dots which are arranged along a main scanning direction and for which the distance between the dots reaches a shortest value among any two dots arranged along the main scanning direction, and the landing time difference $\Delta T_Y$ between the two dots which are arranged along a direction that intersects the main scanning direction and for which the distance between the dots reaches a shortest value among any two dots arranged along a direction that intersects the main scanning direction, is at least 10 ms.

Another embodiment of the present invention provides a method for producing printed matter that includes pretreating the surface of a substrate sequentially with a pretreatment liquid P containing a coagulant, a pretreatment liquid A containing a water-dispersible resin, and then a pretreatment liquid B containing a coagulant, and subsequently applying an aqueous inkjet ink to the pretreated surface using an inkjet system.

DETAILED DESCRIPTION OF THE EMBODIMENTS

Figure 1:
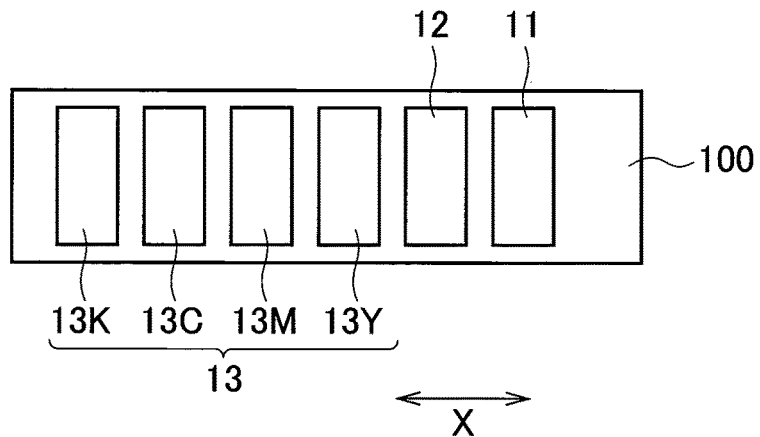
FIG. 1 is a top view schematically illustrating one example of a serial-type recording head unit.

Embodiments of the present invention are described below in detail, but the present invention is not limited to the following embodiments, and needless to say, various amendments or modifications may be made.

In the following description, an "aqueous inkjet ink" is sometimes referred to as simply "the ink" or "the aqueous ink".

<<Method for Producing Printed Matter According to First Embodiment>>

JP 2017-94672 A discloses that by coating a highly permeable medium with a pretreatment liquid having high permeability and then a pretreatment liquid having low permeability, the pretreatment liquid having low permeability that lands on the medium later does not permeate into the medium but is rather retained on the medium surface, thereby improving the reactivity with the ink and the wet spreadability of the ink.

In order to further enhance the fixability of an image to a substrate, it is preferable that the aqueous ink penetrates into the interior of the substrate, with the colorant spreading into the interior of the substrate. In methods such as that described in JP 2017-94672 A, in which two types of pretreatment liquids are retained on the medium surface, fixability of the image may sometimes be an issue.

A method for producing printed matter according to a first embodiment of the present invention includes applying a pretreatment liquid A containing a resin and a pretreatment liquid B containing a coagulant to a substrate, each using an inkjet system (hereafter sometimes referred to as step 1), and, after the applying of the pretreatment liquid A and the pretreatment liquid B, applying an aqueous inkjet ink to the substrate using an inkjet system (hereafter sometimes referred to as step 2). It is preferable that the pretreatment liquid A and the pretreatment liquid B are jetted so as to land on the substrate in a fixed order. It is preferable that for the pretreatment liquid that lands on the substrate first among the pretreatment liquid A and the pretreatment liquid B, at least one of the landing time difference $\Delta T_X$ between the two dots which are arranged along the main scanning direction and for which the distance between the dots reaches a shortest value among any two dots arranged along the main scanning direction, and the landing time difference $\Delta T_Y$ between the two dots which are arranged along a direction that intersects the main scanning direction and for which the distance between the dots reaches a shortest value among any two dots arranged along a direction that intersects the main scanning direction, is at least 10 ms.

The pretreatment liquid A containing a resin may bond partially or totally with the ink coating film, and may enhance the anchoring effect of the ink coating film to the substrate. The pretreatment liquid B containing a coagulant may cause aggregation of the ink and/or the pretreatment liquid A. Further, if the order in which the pretreatment liquid A and the pretreatment liquid B land on the substrate is fixed, then fluctuations in the dot density caused by fluctuations in the permeability of the ink into the substrate, and fluctuations in the dot diameter caused by fluctuations in the degree of aggregation of the ink may be reduced. Furthermore, if, among the pretreatment liquid A and the pretreatment liquid B, the pretreatment liquid that lands on the substrate first is termed the pretreatment liquid E, then, if the pretreatment liquid E is jetted so that at least one of the landing time difference $\Delta T_X$ between the two dots which are arranged along the main scanning direction and for which the distance between the dots reaches a shortest value among any two dots of the pretreatment liquid E arranged along the main scanning direction, and the landing time difference $\Delta T_Y$ between the two dots which are arranged along a direction that intersects the main scanning direction and for which the distance between the dots reaches a shortest value among any two dots of the pretreatment liquid E arranged along a direction that intersects the main scanning direction, is at least 10 ms, the pretreatment liquid that lands on the substrate first can be made to land on the substrate in a state of comparatively low landing density. Accordingly, the rate of permeation of the pretreatment liquid that lands on the substrate first may be increased, and in addition, the pretreatment liquid that lands on the substrate later may also permeate more readily into the substrate, and the ink may become more likely to penetrate into the interior of the substrate and aggregate within the interior of the substrate, meaning an anchoring effect may be more easily achieved. As a result, the fixability of the printed image to the substrate may be improved.

<Substrate>

In the method for producing printed matter of the first embodiment, there are no particular limitations on the substrate. Examples of the substrate include printing papers such as plain papers, coated papers and specialty papers, fabrics, wooden substrates, metal substrates, glass substrates and resin substrates, but a substrate having permeability is preferred.

A fabric is preferred as the substrate. There are no particular limitations on the fabric, and examples include fabrics containing either one type, or two or more types, of fibers selected from among synthetic fibers, natural fibers, inorganic fibers such as metal fibers, glass fibers, rock fibers and slag fibers, recycled fibers such as cellulose-based fibers and protein-based fibers, semi-synthetic fibers such as cellulose-based fibers, and mixed spun fibers of the above fibers. Specific examples of the fibers incorporated in the fabric include natural fibers such as cotton, silk, wool and linen; chemical fibers such as polyester, acrylic, polyurethane, polyamide (for example, nylon and the like), rayon, cupra, acetate, polyvinyl chloride, polyvinylidene chloride, polyethylene, polypropylene, polystyrene, polyfluoroethylene, polyacrylonitrile, polyvinyl alcohol; and mixed spun fibers of the above fibers, and the fabric may include one type, or two or more types, of these fibers.

The fabric may be a woven fabric, a knitted fabric, or a nonwoven fabric or the like.

Porous substrates may also be used as the substrate, and examples of the porous substrate include porous materials obtained by pressing an aluminum nonwoven fabric; porous materials obtained by sintering aluminum powder; porous materials obtained by compression molding of resin fibers such as polyester fibers; gypsum board; and porous materials obtained by molding natural fibers such as glass wool, ceramic materials or wood fibers.

<Pretreatment Liquid A>

The pretreatment liquid A preferably contains a resin. The resin may function as a fixing agent.

Examples of the resin include water-dispersible resins, water-soluble resins, and combinations thereof.

From the viewpoint of improving the fixability, the resin is preferably a nonionic resin, whereas from the viewpoint of improving the image density uniformity, the resin is preferably a cationic resin, a nonionic resin, or a combination thereof.

From the viewpoint of improving the fixability, the resin preferably contains a water-dispersible resin. When the pretreatment liquid A contains the resin in a dispersed form, the fixability may be more easily improved.

The water-dispersible resin may be a resin that has one or more hydrophilic functional groups, such as a self-emulsifying resin, or may be a resin that has been subjected to a surface treatment such as the adhering of a hydrophilic dispersant to the surface of the resin particles. A water-dispersible resin may be dispersed in water in particulate form without dissolving, thus forming an oil-in-water (O/W) emulsion.

A resin that may form a transparent coating film is preferably used as the water-dispersible resin.

When producing the pretreatment liquid A, the water-dispersible resin may be added, for example, in the form of an oil-in-water resin emulsion.

Any one or more of an anionic water-dispersible resin, cationic water-dispersible resin or nonionic water-dispersible resin may be used as the water-dispersible resin.

The anionic water-dispersible resin may be a resin that has one or more anionic functional groups, such as a self-emulsifying resin, or may be a resin that has been subjected to a surface treatment such as the adhering of an anionic dispersant to the surface of the resin particles. Representative examples of the anionic functional group include a carboxyl group and a sulfo group. Examples of the anionic dispersant include anionic surfactants.

The anionic water-dispersible resin may preferably be negatively charged resin particles in which the surface of the resin particles carries a minus charge. The surface charge of the anionic water-dispersible resin particles is preferably within a range from −20 to −500 μeq/g, and is more preferably from −20 to −100 μeq/g.

The surface charge of the resin particles can be evaluated using a particle charge meter. By measuring the amount of anions or amount of cations required to neutralize the sample, the amount of surface charge can be calculated. Examples of particle charge meters that may be used include the colloidal particle charge meter "Model CAS" manufactured by Nihon Rufuto Co., Ltd.

The cationic water-dispersible resin may be a resin that has one or more cationic functional groups, such as a self-emulsifying resin, or may be a resin that has been subjected to a surface treatment such as the adhering of a cationic dispersant to the surface of the resin particles. Representative examples of the cationic functional group include primary, secondary and tertiary amino groups, as well as a pyridine group, imidazole group, benzimidazole group, triazole group, benzotriazole group, pyrazole group or benzopyrazole group. Examples of the cationic dispersant include primary, secondary, tertiary or quaternary amino group-containing acrylic polymers, polyethyleneimine, cationic polyvinyl alcohol resins, and cationic water-soluble multibranched polyesteramide resins.

The cationic water-dispersible resin may preferably be positively charged resin particles in which the surface of the resin particles carries a plus charge. The surface charge of the cationic water-dispersible resin particles is preferably within a range from 20 to 500 μeq/g, and is more preferably from 20 to 100 μeq/g.

The nonionic water-dispersible resin may be a resin that has one or more nonionic functional groups, such as a self-emulsifying resin, or may be a resin that has been subjected to a surface treatment such as the adhering of a nonionic dispersant to the surface of the resin particles. Representative examples of the nonionic functional group include polyoxyalkylene glycol groups and a hydroxyl group. Examples of the nonionic dispersant include nonionic surfactants.

The nonionic water-dispersible resin may preferably be resin particles in which the surface of the resin particles carries almost no charge. The surface charge of the resin particles is preferably within a range from −20 to 20 μeq/g, is more preferably greater than −20 μeq/g but less than 20 μeq/g, and is even more preferably from −10 to 10 μeq/g.

Among these water-dispersible resins, from the viewpoint of improving the fixability, nonionic water-dispersible resins are preferred. Nonionic water-dispersible resins may mix well with both the coagulant and the ink without causing aggregation, and therefore the entire pretreatment liquid and ink layers can more readily form continuous coating films, and superior fixability may be more easily obtained. From the viewpoint of enhancing the fixability and the viewpoint of improving the image density uniformity, a cationic water-dispersible resin, nonionic water-dispersible resin, or a combination thereof is preferred.

Examples of water-dispersible resins that can be used include ethylene-vinyl chloride copolymer resins, (meth) acrylic resins, styrene-maleic anhydride copolymer resins, urethane resins, vinyl acetate-(meth)acrylic copolymer resins, vinyl acetate-ethylene copolymer resins, styrene-(meth) acrylic copolymer resins, polyester resins, olefin resins, vinyl chloride resins, vinyl acetate resins, water-dispersible melamine resins, amide resins, silicone resins, and mixed resins of the above resins, into which one or more hydrophilic functional groups have been introduced, or which have undergone surface treatment such as the adhering of a hydrophilic dispersant to the surface of the resin particles. In this description, the term "(meth)acrylic resin" includes resins containing an acrylic unit, resins containing a methacrylic unit, and resins containing both an acrylic unit and a methacrylic unit.

Among these water-dispersible resins, from the viewpoint of improving the fixability, water-dispersible urethane resins are preferred.

Urethane resins may generally have superior flexibility, and therefore in those cases where a fabric is used as the substrate, the urethane resin may easily withstand stretching of the fabric, and may enable favorable fixability to be more easily maintained. Further, because urethane resins may readily form hydrogen bonds with fabric substrates, the fibers of the fabric substrate may be adhered together with the resin, whereby the elasticity of the fabric may be suppressed to a level close to the elasticity of the ink. Furthermore, because urethane resins may generally have superior flexibility, fibers that have been bonded together with the resin may be less likely to separate.

For example, it is preferable that the resin contains a water-dispersible urethane resin, and that a fabric substrate is used as the substrate.

Preferable examples of the water-dispersible urethane resin include cationic water-dispersible urethane resins and nonionic water-dispersible urethane resins, and more preferable examples of the water-dispersible urethane resin include nonionic water-dispersible urethane resins.

Further, in those cases where, the method includes, prior to step 1, applying a pretreatment liquid P containing a coagulant to the substrate (step P) as described below, the pretreatment liquid A preferably contains an anionic urethane resin as the water-dispersible resin.

Examples of commercially available products of water-dispersible resin emulsions include SUPERFLEX 500M (product name) (a nonionic urethane resin emulsion), SUPERFLEX 740 (product name) (an anionic urethane resin emulsion) and SUPERFLEX 470 (product name) (an anionic urethane resin emulsion) manufactured by DKS Co. Ltd., SUNPLEX PUE-C200B (product name) (a cationic urethane resin emulsion) manufactured by Murayama Chemical Laboratory Co., Ltd., Mowinyl 7720 (product name) (a nonionic water-dispersible acrylic resin emulsion)

manufactured by Japan Coating Resin Corporation, and the ARROWBASE series (such as ARROWBASE SB-1010, ARROWBASE SE-1010. ARROWBASE TC-4010 and ARROWBASE DB-4010 (product names)) (polyolefin resin emulsions) manufactured by Unitika Ltd.

A single water-dispersible resin may be used alone, or a combination of two or more resins may be used.

The amount of the water-dispersible resin, relative to the total mass of the pretreatment liquid A, is preferably at least 1% by mass, more preferably at least 3% by mass, and even more preferably 5% by mass or greater. On the other hand, the amount of the water-dispersible resin in the pretreatment liquid A, relative to the total mass of the pretreatment liquid A, is preferably not more than 30% by mass, more preferably not more than 20% by mass, and even more preferably 15% by mass or less. For example, the amount of the water-dispersible resin in the pretreatment liquid A, relative to the total mass of the pretreatment liquid A, is preferably within a range from 1 to 30% by mass, more preferably from 3 to 20% by mass, and even more preferably from 5 to 15% by mass.

Examples of water-soluble resins include polyvinyl alcohol, polyacrylic acid, neutralized products of polyacrylic acid, acrylic acid/maleic acid copolymers, acrylic acid/sulfonic acid copolymers, and styrene/maleic acid copolymers.

A single water-soluble resin may be used alone, or a combination of a plurality of water-soluble resins may be used.

The amount of the water-soluble resin in the pretreatment liquid A relative to the total mass of the pretreatment liquid A is, for example, preferably within a range from 1 to 30% by mass, more preferably from 3 to 20% by mass, and even more preferably from 5 to 15% by mass.

One of the above resins may be used alone, or a combination of a plurality of the above resins may be used.

The total amount of resin in the pretreatment liquid A, relative to the total mass of the pretreatment liquid A, is preferably at least 1% by mass, more preferably at least 3% by mass, and even more preferably 5% by mass or greater. On the other hand, the total amount of resin in the pretreatment liquid A, relative to the total mass of the pretreatment liquid A, is preferably not more than 30% by mass, more preferably not more than 20% by mass, and even more preferably 15% by mass or less. For example, the total amount of resin in the pretreatment liquid A, relative to the total mass of the pretreatment liquid A, is preferably within a range from 1 to 30% by mass, more preferably from 3 to 20% by mass, and even more preferably from 5 to 15% by mass.

The pretreatment liquid A may also contain water. For example, the pretreatment liquid A preferably contains water as the main solvent. There are no particular limitations on the water used, and examples thereof include ion-exchanged water, distilled water, ultrapure water and deionized water.

The amount of water in the pretreatment liquid A, relative to the total mass of the pretreatment liquid A, is preferably at least 10% by mass, more preferably at least 30% by mass, even more preferably at least 40% by mass, and still more preferably 50% by mass or greater. For example, the amount of water in the pretreatment liquid A relative to the total mass of the pretreatment liquid A, may be 95% by mass or less, or may be 90% by mass or less. For example, the amount of water in the pretreatment liquid A, relative to the total mass of the pretreatment liquid A, is preferably within a range from 10 to 95% by mass, more preferably from 30 to 90% by mass, even more preferably from 40 to 80% by mass, and still more preferably from 50 to 80% by mass.

The pretreatment liquid A may contain a water-soluble organic solvent, either in combination with the water, or instead of the water.

From the viewpoint of the viscosity adjustment and moisture retention effects, the water-soluble organic solvent is preferably a water-soluble organic solvent that is liquid at room temperature and soluble in water. Examples of water-soluble organic solvents that may be used include lower alcohols such as methanol, ethanol, 1-propanol, isopropanol, 1-butanol, 2-butanol, isobutanol, 1,3-propanediol, 1,3-butanediol, 1,2-butanediol, 1,2-pentanediol, 1,2-hexanediol and 2-methyl-2-propanol; glycols such as ethylene glycol, diethylene glycol, triethylene glycol, tetraethylene glycol, pentaethylene glycol, propylene glycol, dipropylene glycol and tripropylene glycol; glycerol; acetins (monoacetin and diacetin); glycol derivatives such as diethylene glycol monomethyl ether, diethylene glycol monobutyl ether, diethylene glycol dimethyl ether, diethylene glycol monoethyl ether acetate, triethylene glycol monomethyl ether, triethylene glycol monoethyl ether, triethylene glycol monopropyl ether, triethylene glycol monobutyl ether, tripropylene glycol monobutyl ether, triethylene glycol monohexyl ether, tetraethylene glycol monomethyl ether, tetraethylene glycol monoethyl ether, tetraethylene glycol monobutyl ether, tetraethylene glycol dimethyl ether and tetraethylene glycol diethyl ether; as well as triethanolamine, 1-methyl-2-pyrrolidone, β-thiodiglycol and sulfolane. Low-molecular weight polyalkylene glycols, including polyethylene glycols having an average molecular weight within a range from 190 to 630, such as an average molecular weight of 200, 300, 400 or 600, diol-type polypropylene glycols having an average molecular weight within a range from 200 to 600, such as an average molecular weight of 400, and triol-type polypropylene glycols having an average molecular weight within a range from 250 to 800, such as an average molecular weight of 300 or 700, may also be used.

A single water-soluble organic solvent may be used alone, or a combination of two or more water-soluble organic solvents may be used.

The amount of the water-soluble organic solvent in the pretreatment liquid A, relative to the total mass of the pretreatment liquid A, is preferably at least 1% by mass, more preferably at least 5% by mass, and even more preferably 10% by mass or greater. On the other hand, the amount of the water-soluble organic solvent in the pretreatment liquid A, relative to the total mass of the pretreatment liquid A, is preferably not more than 50% by mass, more preferably not more than 40% by mass, and even more preferably 20% by mass or less. For example, the amount of the water-soluble organic solvent in the pretreatment liquid A, relative to the total mass of the pretreatment liquid A, is preferably within a range from 1 to 50% by mass, more preferably from 5 to 50% by mass, even more preferably from 10 to 40% by mass, and still more preferably from 10 to 200% by mass.

The total amount of water and water-soluble organic solvent in the pretreatment liquid A (or if only one of the two is included, the amount of the included one, this definition also applies below), relative to the total mass of the pretreatment liquid A, is preferably at least 50% by mass and more preferably at least 70% by mass, and may be 80% by mass or greater. On the other hand, the total amount of water and water-soluble organic solvent in the pretreatment liquid A, relative to the total mass of the pretreatment liquid A, may be not more than 99% by mass, or may be 95% by mass or less. For example, the total amount of water and water-soluble organic solvent in the pretreatment liquid A, relative to the total mass of the pretreatment liquid A, is preferably within a range from 50 to 99% by mass, and more preferably from 70 to 95% by mass, and may be within a range from 80 to 90% by mass.

The pretreatment liquid A preferably also contains a surfactant.

For example, an ionic surfactant, a nonionic surfactant, or a combination thereof may be used as the surfactant. For the ionic surfactant, a cationic surfactant, anionic surfactant, or amphoteric surfactant or the like may be used. The surfactant is preferably a nonionic surfactant. The HLB value of the surfactant is preferably within a range from 5 to 20.

Examples of nonionic surfactants include acetylene glycol-based surfactants, silicone-based surfactants, polyoxyethylene alkyl ether-based surfactants, polyoxypropylene alkyl ether-based surfactants, polyoxyethylene alkyl phenyl ether-based surfactants, polyoxypropylene alkyl phenyl ether-based surfactants, polyoxyethylene fatty acid ester-based surfactants, polyoxypropylene fatty acid ester-based surfactants, sorbitan fatty acid ester-based surfactants, polyoxyethylene sorbitan fatty acid ester-based surfactants, polyoxyethylene sorbitol fatty acid ester-based surfactants, and glycerol fatty acid ester-based surfactants. Any one of these surfactants may be used alone, or a combination of two or more surfactants may be used.

Among these surfactants, an acetylene glycol-based surfactant, silicone-based surfactant, or a combination thereof can be used favorably, and a silicone-based surfactant is more preferred.

Among silicone-based surfactants, examples of the silicone-based surfactants which may be preferably used include polyether-modified silicone-based surfactants, alkyl/aralkyl-comodified silicone-based surfactants, and acrylic silicone-based surfactants. Examples of commercially available silicone-based surfactants include the SILFACE SAG series (such as SILFACE SAG002 (product name)) manufactured by Nissin Chemical Industry Co., Ltd.

Specific examples of other nonionic surfactants include acetylene glycol-based surfactants, such as the Surfynol series manufactured by Air Products and Chemicals, Inc. (including Surfynol 104E, Surfynol 104H, Surfynol 420, Surfynol 440, Surfynol 465 and Surfynol 485 (all product names)) and OLFINE E1004, OLFINE E1010, and OLFINE E1020 and the like (all product names) manufactured by Nissin Chemical Industry Co., Ltd.; and polyoxyethylene alkyl ether-based surfactants, such as the EMULGEN series manufactured by Kao Corporation (including EMULGEN 102KG, EMULGEN 103, EMULGEN 104P, EMULGEN 105, EMULGEN 106, EMULGEN 108, EMULGEN 120, EMULGEN 147, EMULGEN 150, EMULGEN 220, EMULGEN 350, EMULGEN 404, EMULGEN 420, EMULGEN 705, EMULGEN 707, EMULGEN 709, EMULGEN 1108, EMULGEN 4085 and EMULGEN 2025G).

A single surfactant may be used alone, or a combination of two or more surfactants may be used.

The amount of the surfactant, relative to the total mass of the pretreatment liquid A, is preferably at least 0.1% by mass, and more preferably 0.5% by mass or greater. Further, the amount of the surfactant, relative to the total mass of the pretreatment liquid A, is preferably not more than 10% by mass, and more preferably 5% by mass or less. For example, the amount of the surfactant, relative to the total mass of the pretreatment liquid A, is preferably within a range from 0.1 to 10% by mass, and more preferably from 0.5 to 5% by mass.

In order to achieve crosslinking of the resin component, the pretreatment liquid A may also contain a crosslinking component. The crosslinking component may be selected, for example, from among the cross linking components described below that may be included in the ink. When a crosslinking component is added, the amount of the crosslinking component, relative to the total mass of the pretreatment liquid A, is preferably within a range from 0.1 to 5% by mass, and more preferably from 1 to 3% by mass.

The pretreatment liquid A may also contain one or more other optional components. Examples of such optional components include antifoaming agents, pH adjusters, antioxidants, preservatives, infrared absorbers, and ultraviolet absorbers.

There are no particular limitations on the method used for producing the pretreatment liquid A, and production may be performed using an appropriate conventional method. For example, the pretreatment liquid A may be prepared by placing all of the components in a stirring device such as a three-one motor and dispersing the components, either in a single batch or in a number of separate batches, and then, if required, passing the resulting dispersion through a filtration device such as a membrane filter.

<Pretreatment Liquid B>

The pretreatment liquid B preferably contains a coagulant.

The coagulant preferably has an action that reduces the dispersibility and/or solubility of the colorant in the aqueous ink, thereby causing aggregation of the colorant.

Examples of the coagulant include cationic resins, polyvalent metal salts, organic acids, and low-polarity solvents and the like.

Cationic water-soluble resins, cationic water-dispersible resins, or combinations thereof may be used as the cationic resin. The cationic resin is preferably a cationic water-soluble resin.

Examples of cationic water-soluble resins include polyethyleneimine (PEI), polyvinylamine, polyallylamine and salts thereof, polyvinylpyridine, cationic acrylamide copolymers, and epichlorohydrin-based polymers. More specifically, for example, polydiallyldimethylammonium chloride and/or the like may be used. Specific examples of the epichlorohydrin-based polymers include dimethylamine-epichlorohydrin polymers and dimethylamine-ammonia-epichlorohydrin polymers.

Examples of commercially available products of cationic water-soluble resins include the SHALLOL series manufactured by DKS Co., Ltd. (including SHALLOL DC-303P and SHALLOL DC-902P (both product names)), the UNISENSE series manufactured by Senka Corporation (including UNISENSE FCA1000L, UNISENSE FPA100L, UNISENSE KHE100L and UNISENSE KHE104L (all product names)), and the HC Polymer series manufactured by Osaka Organic Chemical Industry Co., Ltd. (including HC Polymer 1S, HC Polymer 1N, HC Polymer 1NS, HC Polymer 2, and HC Polymer 2L (all product names)).

Examples of commercially available products of polyethyleneimines include the EPOMIN series manufactured by Nippon Shokubai Co., Ltd. (including EPOMIN SP-006, EPOMIN SP-012, EPOMIN SP-018, and EPOMIN SP-200 (all product names)), and Lupasol FG, Lupsaol G20 Water-free, and Lupasol PR 8515 (all product names) manufactured by BASF Japan Ltd.

Examples of commercially available products of polyallylamines include products manufactured by Nitto Boseki Co., Ltd., including allylamine polymers PAA-01, PAA-03 and PAA-05 (all product names), allylamine hydrochloride polymers PAA-HCL-01, PAA-HCL-03 and PAA-HCL-05 (all product names), and the allylamine amide sulfate polymer PAA-SA (product name).

As the cationic water-dispersible resin, for example, one or more cationic water-dispersible resins selected from among the water-dispersible resins that may be used in the pretreatment liquid A as described above may be used.

A resin that may form a transparent coating film is preferably used as the cationic water-dispersible resin.

When producing the treatment liquid, the water-dispersible resin may be added in the form of an oil-in-water resin emulsion.

A single cationic resin may be used alone, or a combination of two or more cationic resins may be used.

The amount of the cationic resin in the pretreatment liquid B, relative to the total mass of the pretreatment liquid B, is preferably at least 1% by mass, more preferably at least 3% by mass, and even more preferably 5% by mass or greater. On the other hand, the amount of the cationic resin in the pretreatment liquid B, relative to the total mass of the pretreatment liquid B, is preferably not more than 30% by mass, more preferably not more than 20% by mass, and even more preferably 15% by mass or less. For example, the amount of the cationic resin in the pretreatment liquid B, relative to the total mass of the pretreatment liquid B, is preferably within a range from 1 to 30% by mass, more preferably from 3 to 20% by mass, and even more preferably from 5 to 15% by mass.

Examples of polyvalent metal salts that may be used include halides, nitrates, sulfates, acetates, fatty acid salts, lactates, and hydrochlorides and the like of a divalent or higher-valent metal. Examples of the halides include chlorides, bromides and iodides. Examples of the divalent or higher metals include divalent alkaline earth metals such as Ca, Mg, Sr and Ba, divalent metals such as Ni, Zn, Cu and Fe(II), and trivalent metals such as Fe(III) and Al, and of these, alkaline earth metals are preferred.

More specific examples of the polyvalent metal salts include calcium chloride, calcium nitrate, magnesium chloride, magnesium nitrate, copper nitrate, calcium acetate and magnesium acetate.

A single polyvalent metal salt may be used alone, or a combination of two or more polyvalent metal salts may be used.

The amount of the polyvalent metal salt in the pretreatment liquid B, relative to the total mass of the pretreatment liquid B, is preferably at least 1% by mass, more preferably at least 3% by mass, and even more preferably 5% by mass or greater. On the other hand, the amount of the polyvalent metal salt in the pretreatment liquid B, relative to the total mass of the pretreatment liquid B, is preferably not more than 30% by mass, more preferably not more than 20% by mass, and even more preferably 15% by mass or less. For example, the amount of the polyvalent metal salt in the pretreatment liquid B, relative to the total mass of the pretreatment liquid B, is preferably within a range from 1 to 30% by mass, more preferably from 3 to 20% by mass, and even more preferably from 5 to 15% by mass.

Examples of the organic acids include formic acid, acetic acid, oxalic acid, citric acid, malic acid and ascorbic acid.

An organic acid that is liquid at 23° C. is preferably used as the coagulant. By applying the coagulant to the substrate surface as a liquid, the substrate is less likely to be affected by friction. In those cases where the pretreatment liquid B is applied using an inkjet system, when a liquid organic acid is used as the coagulant, the occurrence of jetting faults in the recording head may be prevented across long periods of time.

Acetic acid and lactic acid can be used favorably as the organic acid that is liquid at 23° C., and lactic acid is particularly desirable.

The boiling point of the organic acid is preferably at least 120° C.

In step 2, the recording head into which the ink has been loaded may perform printing while moving over the substrate to which each of the pretreatment liquids has been applied. In those cases where an organic acid having a boiling point of at least 120° C. is used, the organic acid having a boiling point of at least 120° C. is less likely to volatilize from the substrate to which the pretreatment liquids have been applied, and, therefore, the aqueous ink in the nozzle portions of the recording head is less likely to contact with volatilized organic acid. Accordingly, degeneration of the aqueous ink caused by the organic acid at the nozzle portions may be prevented. As a result, jetting faults of the aqueous ink from the recording head may be suppressed.

A single organic acid may be used alone, or a combination of two or more organic acids may be used.

The amount of the organic acid in the pretreatment liquid B, relative to the total mass of the pretreatment liquid B, is preferably at least 1% by mass, more preferably at least 3% by mass, and even more preferably 5% by mass or greater. On the other hand, the amount of the organic acid in the pretreatment liquid B, relative to the total mass of the pretreatment liquid B, is preferably not more than 30% by mass, more preferably not more than 20% by mass, and even more preferably 15% by mass or less. For example, the amount of the organic acid in the pretreatment liquid B, relative to the total mass of the pretreatment liquid B, is preferably within a range from 1 to 30% by mass, more preferably from 3 to 20% by mass, and even more preferably from 5 to 15% by mass.

Examples of preferred low-polarity solvents include fatty acid ester solvents, glycol ether solvents, and acetate-based solvents and the like.

For example, a solvent having an SP value of not more than 10 $(cal/cm^3)^{1/2}$ is preferred as the low-polarity solvent.

In this description, the SP value refers to the SP value determined using the Fedors equation, and more specifically, is the value calculated using the equation below proposed by Fedors. In the following equation, $\Delta ei$ represents the evaporation energy of the atom or atom grouping of a component i, and $\Delta vi$ represents the molar volume of the atom or atom grouping of the component i (see Hansen Solubility Parameters: A User's Handbook, Second Edition, Charles M. Hansen, CRC Press, 2007)

$$\delta=[(\text{sum}\Delta ei)/(\text{sum}\Delta vi)]^{1/2}$$

A single low-polarity solvent may be used alone, or a combination of two or more low-polarity solvents may be used.

The amount of the low-polarity solvent in the pretreatment liquid B, relative to the total mass of the pretreatment liquid B, is preferably within a range from 1 to 30% by mass, more preferably from 3 to 20% by mass, and even more preferably from 5 to 15% by mass.

Of the various possibilities of the coagulant, from the viewpoints of the aggregation properties relative to the ink and the pretreatment liquid A, and the image density, a cationic resin, a polyvalent metal salt, an organic acid, or combination thereof is preferred.

From the viewpoint of improving the fixability, and the viewpoint of improving the image density, the coagulant preferably contains at least one selected from the group consisting of a cationic resin, a polyvalent metal salt and an organic acid. From the viewpoint of improving the fixability, it is more preferable that the coagulant contains an organic acid. In those case where the pretreatment liquid A contains an organic acid, the amount of carboxyl groups in the pretreatment liquid A tends to increase, and, therefore, the fixability may be further improved by the formation of hydrogen bonds with the ink, the pretreatment liquid A and the substrate using these carboxyl groups.

From the viewpoints of improving the image density uniformity and improving the fixability, the pretreatment liquid B preferably contains a coagulant that causes aggregation of the ink, but does not cause aggregation of the resin in the pretreatment liquid A.

In those cases where the pretreatment liquid A does not aggregate under the action of the pretreatment liquid B, because the coagulant in the pretreatment liquid B is not used for aggregation of the pretreatment liquid A, the aggregation action of the pretreatment liquid B on the ink is less likely to be impaired, and therefore the image density uniformity may be further improved.

Further, in those cases where the pretreatment liquid A does not aggregate under the action of the pretreatment liquid B, a continuous coating film may be obtained more easily, meaning more superior fixability may be obtained.

Specifically, it is preferable that, for example, the pretreatment liquid A contains a cationic resin, a nonionic resin, or a combination thereof, and the pretreatment liquid B contains a cationic resin, a polyvalent metal salt, an organic acid, or a combination thereof.

The coagulant of the pretreatment liquid B is preferably different from the resin of the pretreatment liquid A.

A single coagulant may be used alone, or a combination of a plurality of coagulants may be used.

The total amount of coagulant in the pretreatment liquid B, relative to the total mass of the pretreatment liquid B, is preferably at least 1% by mass, more preferably at least 3% by mass, and even more preferably 5% by mass or greater. On the other hand, the total amount of coagulant in the pretreatment liquid B, relative to the total mass of the pretreatment liquid B, is preferably not more than 30% by mass, more preferably not more than 20% by mass, and even more preferably 15% by mass or less. For example, the total amount of coagulant in the pretreatment liquid B, relative to the total mass of the pretreatment liquid B, is preferably within a range from 1 to 30% by mass, more preferably from 3 to 20% by mass, and even more preferably from 5 to 15% by mass.

The pretreatment liquid B may also contain water. For example, the pretreatment liquid B preferably contains water as the main solvent. There are no particular limitations on the water used, and examples include ion-exchanged water, distilled water, ultrapure water and deionized water.

The amount of water in the pretreatment liquid B, relative to the total mass of the pretreatment liquid B, is preferably at least 10% by mass, more preferably at least 30% by mass, and even more preferably 50% by mass or greater. For example, the amount of water in the pretreatment liquid B relative to the total mass of the pretreatment liquid B, may be 95% by mass or less, or may be 90% by mass or less. For example, the amount of water in the pretreatment liquid B, relative to the total mass of the pretreatment liquid B, is preferably within a range from 10 to 95% by mass, more preferably from 30 to 90% by mass, and even more preferably 50 to 90% by mass.

The pretreatment liquid B may contain a water-soluble organic solvent, either in combination with the water, or instead of the water.

From the viewpoint of the viscosity adjustment and moisture retention effects, the water-soluble organic solvent is preferably a water-soluble organic solvent that is liquid at room temperature and soluble in water. As the water-soluble organic solvent, for example, one or more water-soluble organic solvents selected from among the water-soluble organic solvents that may be used in the pretreatment liquid A as described above may be used.

A single water-soluble organic solvent may be used alone, or a combination of two or more water-soluble organic solvents may be used.

The amount of the water-soluble organic solvent in the pretreatment liquid B, relative to the total mass of the pretreatment liquid B, is preferably at least 1% by mass, and more preferably 5% by mass or greater. On the other hand, the amount of the water-soluble organic solvent in the pretreatment liquid B, relative to the total mass of the pretreatment liquid B, is preferably not more than 40% by mass, and more preferably 20% by mass or less. For example, the amount of the water-soluble organic solvent in the pretreatment liquid B, relative to the total mass of the pretreatment liquid B, is preferably within a range from 1 to 40% by mass, and more preferably from 5 to 20% by mass.

The total amount of water and water-soluble organic solvent in the pretreatment liquid B (or if only one of the two is included, the amount of the included one, this definition also applies below), relative to the total mass of the pretreatment liquid B, is preferably at least 50% by mass and more preferably at least 70% by mass, and may be 80% by mass or greater. On the other hand, the total amount of water and water-soluble organic solvent in the pretreatment liquid B, relative to the total mass of the pretreatment liquid B, may be not more than 99/o by mass, or may be 95% by mass or less. For example, the total amount of water and water-soluble organic solvent in the pretreatment liquid B, relative to the total mass of the pretreatment liquid B, is preferably within a range from 50 to 99% by mass, and more preferably from 70 to 95% by mass, and may be within a range from 80 to 90% by mass.

The pretreatment liquid B preferably also contains a surfactant.

Examples of surfactants that may be used include the surfactants described above for inclusion in the pretreatment liquid A.

A single surfactant may be used alone, or a combination of two or more surfactants may be used.

The amount of the surfactant, relative to the total mass of the pretreatment liquid B, is preferably at least 0.1% by mass, and more preferably 0.5% by mass or greater. Further, the amount of the surfactant, relative to the total mass of the pretreatment liquid B, is preferably not more than 10% by mass, and more preferably 5% by mass or less. For example, the amount of the surfactant, relative to the total mass of the pretreatment liquid B, is preferably within a range from 0.1 to 10% by mass, and more preferably from 0.5 to 5% by mass.

In those cases where the pretreatment liquid B contains a resin component, in order to achieve crosslinking of the resin component, the pretreatment liquid B may also contain a crosslinking component. The crosslinking component may be selected, for example, from among the cross linking components described below that may be included in the ink. When a crosslinking component is added, the amount of the crosslinking component, relative to the total mass of the pretreatment liquid B, is preferably within a range from 0.1 to 5% by mass, and more preferably from 1 to 3% by mass.

The pretreatment liquid B may also contain one or more other optional components. Examples of such optional components include antifoaming agents, pH adjusters, antioxidants, preservatives, infrared absorbers, and ultraviolet absorbers.

There are no particular limitations on the method used for producing the pretreatment liquid B, and production may be performed using an appropriate conventional method. For example, the pretreatment liquid B may be prepared by placing all of the components in a stirring device such as a three-one motor and dispersing the components, either in a single batch or in a number of separate batches, and then, if required, passing the resulting dispersion through a filtration device such as a membrane filter.

<Aqueous Inkjet Ink>

The aqueous inkjet ink preferably contains a colorant.

Examples of the colorant include pigments and dyes, and a pigment or dye may be used alone, or a combination of the two may be used. From the viewpoint of the weather resistance and water resistance of the printed matter, a pigment is preferably used as the colorant.

A non-white pigment, a white pigment, or a combination thereof may be used as the pigment.

Examples of non-white pigments that may be used include organic pigments, examples thereof including azo-based pigments, phthalocyanine-based pigments, dye-based pigments, condensed polycyclic pigments, nitro-based pigments and nitroso-based pigments (with specific examples including brilliant carmine 6B, lake red C, Watchung red, disazo yellow, Hansa yellow, phthalocyanine blue, phthalocyanine green, alkali blue and aniline black); inorganic pigments, examples thereof including metals such as cobalt, iron, chromium, copper, zinc, lead, titanium, vanadium, manganese and nickel, as well as metal oxides and sulfides, and yellow ocher, ultramarine and iron blue pigments; and carbon blacks examples thereof including furnace carbon black, lamp black, acetylene black and channel black.

In those cases where a colored substrate or a substrate having surface texture such as a fabric is used as the substrate, a method may be used in which a base layer is first formed using a white ink that uses a white pigment in order to conceal the color or the like of the substrate, and an image is subsequently formed on top of this white layer.

Examples of white pigments include inorganic pigments such as titanium oxide, zinc oxide, zinc sulfide, antimony oxide and zirconium oxide. Besides inorganic pigments, hollow resin microparticles and polymer microparticles may also be used. Among these, from the viewpoint of opacity, the use of titanium oxide is preferred.

The volume average particle size of the pigment is preferably within a range from 50 to 500 nm, and more preferably from 50 to 200 nm.

Self-dispersing pigments in which the pigment surface has been modified with hydrophilic functional groups may also be used. Examples of commercially available self-dispersing pigments include the CAB-O-JET series manufactured by Cabot Corporation (including CAB-O-JET 200, CAB-O-JET 300, CAB-O-JET 250C, CAB-O-JET 260M and CAB-O-JET 270 (all product names)), and the products BONJET BLACK CW-1S, BONJET BLACK CW-2, and BONJET BLACK CW-3 (all product names) and the like manufactured by Orient Chemical Industries, Ltd.

Microencapsulated pigments in which the pigment is coated with a resin may also be used.

Pigment dispersions in which the pigment has been dispersed in advance using a pigment dispersant may also be used. Examples of commercially available pigment dispersions in which the pigment has been dispersed using a pigment dispersant include the HOSTAJET series (product name) manufactured by Clariant AG, and the FUJI SP series (product name) manufactured by Fuji Pigment Co., Ltd. Pigment dispersions that have been dispersed using a pigment dispersant described below may also be used.

A single pigment may be used alone, or a combination of two or more pigments may be used.

The amount of the pigment varies depending on the type of pigment, but from the viewpoints of color development and the like, the amount of the pigment, expressed as a solid fraction amount relative to the total mass of the ink, is preferably within a range from about 0.1 to 30% by mass, and more preferably from 0.1 to 15% by mass.

In order to ensure stable dispersion of the pigment in the water, the ink may also contain a pigment dispersant.

Examples of commercially available pigment dispersants include the TEGO Dispers series manufactured by Evonik Industries AG (including TEGO Dispers 740W, TEGO Dispers 750W, TEGO Dispers 755W, TEGO Dispers 757W and TEGO Dispers 760W (all product names)), the Solsperse series manufactured by The Lubrizol Corporation (including Solsperse 20000, Solsperse 27000, Solsperse 41000, Solsperse 41090, Solsperse 43000, Solsperse 44000 and Solsperse 46000 (all product names)), the Joncryl series manufactured by Johnson Polymer, Inc. (including Joncryl 57, Joncryl 60, Joncryl 62, Joncryl 63, Joncryl 71 and Joncryl 501 (all product names)), as well as DISPERBYK-102, DISPERBYK-185, DISPERBYK-190, DISPERBYK-193 and DISPERBYK-199 (all product names) manufactured by BYK Additives & Instruments GmbH.

Examples of surfactant-type dispersants that may be used include anionic surfactants such as the DEMOL series manufactured by Kao Corporation (including DEMOL EP, DEMOL N, DEMOL RN, DEMOL NL, DEMOL RNL and DEMOL T-45 (all product names)), and nonionic surfactants such as the EMULGEN series manufactured by Kao Corporation (including EMULGEN A-60, EMULGEN A-90, EMULGEN A-500, EMULGEN B-40, EMULGEN L-40 and EMULGEN 420 (all product names)).

A single pigment dispersant may be used alone, or a combination of two or more pigment dispersants may be used.

There are no particular limitations on the amount of the pigment dispersant in the ink, which may vary depending on the type of dispersant used, but generally, the amount of the pigment dispersant, expressed as a mass ratio of the solid fraction relative to a value of 1 for the pigment, is preferably within a range from 0.005 to 0.5.

In terms of dyes, any of the dyes typically used in the technical field of printing may be used without any particular limitations. Specific examples include basic dyes, acid dyes, direct dyes, soluble vat dyes, acid mordant dyes, mordant dyes, reactive dyes, vat dyes and sulfide dyes, and among these, water-soluble dyes and dyes that become water-soluble upon reduction or the like may be used. More specific examples of dyes that may be used include azo dyes, rhodamine dyes, methine dyes, azomethine dyes, xanthene dyes, quinone dyes, triphenylmethane dyes, diphenylmethane dyes, and methylene blue. Any one of these dyes may be used alone, or a combination of two or more of these dyes may be used.

A single dye may be used alone, or a combination of two or more dyes may be used.

The amount of the dye may vary depending on the type of dye, but from the viewpoints of color development and the like, the amount of the dye, expressed as a solid fraction amount relative to the total mass of the aqueous ink, is preferably within a range from about 0.1 to 30% by mass, more preferably from 0.5 to 15% by mass, and even more preferably from 1 to 10% by mass.

The ink preferably contains water. The ink preferably contains a colorant and water.

There are no particular limitations on the water, provided it functions as a solvent for the ink, and examples include ion-exchanged water, distilled water, ultrapure water and deionized water.

The amount of water relative to the total mass of the ink is preferably at least 20% by mass, more preferably at least 30% by mass, even more preferably at least 40% by mass, still more preferably at least 50% by mass, and still more preferably 60% by mass or greater. On the other hand, the amount of water relative to the total mass of the ink is preferably not more than 95% by mass, more preferably not more than 90% by mass, even more preferably not more than 80% by mass, and still more preferably 70% by mass or less. For example, the amount of water relative to the total mass of the ink is preferably within a range from 20 to 95% by mass, more preferably from 30 to 90% by mass, even more preferably from 40 to 80% by mass, still more preferably from 50 to 80% by mass, and still more preferably from 60 to 70% by mass.

The ink may also contain a water-soluble organic solvent in addition to the water.

Organic compounds that are liquid at room temperature and soluble in or miscible with water may be used as the water-soluble organic solvent, and the use of a water-soluble organic solvent that may mix uniformly with an equal volume of water at one atmosphere and 20° C. is preferred.

As the water-soluble organic solvent, for example, one or more water-soluble organic solvents selected from among the water-soluble organic solvents described above for the use in the pretreatment liquid A may be used.

The amount of the water-soluble organic solvent, relative to the total mass of the ink, is preferably within a range from 1 to 80% by mass and more preferably from 5 to 60% by mass, and may be from 10 to 50% by mass, or from 20 to 40% by mass.

The ink may contain a water-dispersible resin, a water-soluble resin, or a combination thereof. In those cases where at least one of a water-dispersible resin and a water-soluble resin is included in the ink, the fixability of the colorant to the substrate may be improved, and, therefore, superior coloration may be achieved with a small amount of the colorant.

There are no particular limitations on the water-dispersible resin, and for example, one or more water-dispersible resins selected from among the water-dispersible resins that may be used as the resin in the pretreatment liquid A as described above may be used.

Any resin among anionic water-dispersible resins, cationic water-dispersible resins and nonionic water-dispersible resins may be used as the water-dispersible resin, but an anionic water-dispersible resin is preferred.

Water-dispersible urethane resins are preferred as the water-dispersible resin, and an anionic water-dispersible urethane resin is more desirable.

There are also no particular limitations on the water-soluble resin, and for example, one or more water-soluble resins selected from among the water-soluble resins that may be used as the resin in the pretreatment liquid A as described above may be used.

The total amount of water-soluble resins and water-dispersible resins, expressed as a mass ratio of the solid fraction amount relative to a value of 1 for the colorant, is preferably within a range from 0.1 to 15, more preferably from 1 to 5, and even more preferably from 2 to 4. By ensuring that the amount of resin falls within this range, the fixability and image quality of the image printed onto the surface of the substrate may be ensured.

The mass ratio of the resin relative to a value of 1 for the colorant is preferably at least 0.1, more preferably at least 0.5, and even more preferably 2 or greater. Provided this ratio of the resin relative to a value of 1 for the colorant is at least 0.1, the fixability of the image may be further enhanced. Further, the mass ratio of the resin relative to a value of 1 for the colorant is preferably not more than 15, more preferably not more than 7, even more preferably not more than 5, and still more preferably 4 or less. Provided this ratio of the resin relative to a value of 1 for the colorant is not more than 15, the stability of the aqueous ink within the printing apparatus may be improved.

The total amount of water-dispersible resin and water-soluble resin, expressed as a solid fraction amount relative to the total mass of the ink, is preferably at least 0.1% by mass, more preferably at least 1% by mass, and even more preferably 5% by mass or greater.

Further, the total amount of water-dispersible resin and water-soluble resin, relative to the total mass of the ink, is preferably not more than 20% by mass, and even more preferably 15% by mass or less.

For example, the total amount of water-dispersible resin and water-soluble resin, expressed as a solid fraction amount relative to the total mass of the ink, is preferably within a range from 0.1 to 20% by mass, more preferably from 1 to 20% by mass, and even more preferably from 5 to 15% by mass.

The ink may contain a surfactant. In those case where a surfactant is included in the ink, jetting the ink stably using an inkjet system may become easier, and the permeation of the ink into the substrate may be better controlled.

Examples of surfactants that may be used include the surfactants described above for use in the pretreatment liquid A.

A single surfactant may be used alone, or a combination of two or more surfactants may be used.

The amount of the surfactant, relative to the total mass of the ink, is preferably at least 0.1% by mass, and more preferably 0.5% by mass or greater. On the other hand, the amount of the surfactant, relative to the total mass of the ink, is preferably not more than about 10% by mass, more preferably not more than about 5% by mass, even more preferably not more than 4% by mass, and still more preferably 3% by mass or less. For example, the amount of the surfactant, relative to the total mass of the ink, is preferably within a range from 0.1 to 10% by mass, more preferably from 0.1 to 5% by mass, even more preferably from 0.1 to 4% by mass, and still more preferably from 0.5 to 3% by mass.

In order to cause crosslinking of the resin component to strengthen the coating film and further enhance the fixability, the ink may contain a crosslinking component. Examples of the crosslinking component include blocked isocyanates, oxazoline group-containing compounds, (poly)carbodiimides, and aziridine and the like.

The amount of the crosslinking component, relative to the total mass of the ink, is preferably within a range from 0.1 to 5% by mass, and more preferably from 1 to 3% by mass.

Besides the components described above, one or more other optional components may also be added to the ink. Examples of such optional components include antifoaming agents, pH adjusters, antioxidants, preservatives, infrared absorbers, and ultraviolet absorbers.

From the viewpoint of the ink storage stability, the pH of the ink is preferably within a range from 7.0 to 10.0, and more preferably from 7.5 to 9.0.

The viscosity of the ink may be adjusted as appropriate, but for example, from the viewpoint of the jetting properties, the viscosity at 23° C. is preferably within a range from 1 to 30 mPa·s.

There are no particular limitations on the method used for producing the ink, and production may be performed using an appropriate conventional method. For example, the ink may be prepared by placing all of the components in a stirring device such as a three-one motor and dispersing the components, either in a single batch or in a number of separate batches, and then, if required, passing the resulting dispersion through a filtration device such as a membrane filter.

<Method for Producing Printed Matter>

A method for producing printed matter using the pretreatment liquid A, the pretreatment liquid B and the aqueous ink is described below.

First is a description of step 1. In step 1, the pretreatment liquid A and the pretreatment liquid B are each applied to a substrate using an inkjet system.

There are no particular limitations on the inkjet system, and systems using typical recording heads may be used. For example, any of serial systems using a serial-type recording head and line head systems using a line head-type recording head may be used, but a serial system is preferred.

If the nozzle section for jetting the pretreatment liquid B containing a coagulant and the nozzle section for jetting the aqueous ink are positioned close together, then, the nozzle section for jetting the pretreatment liquid B may generate a mist containing the coagulant, and this mist may sometimes adhere to the nozzle section for jetting the aqueous ink. As a result, the aqueous ink may sometimes aggregate within the nozzle section, causing nozzle blockages that may sometimes result in jetting faults. In a line head inkjet recording apparatus, even if jetting faults are caused in one nozzle in the linear nozzle array, the effect on the image may sometimes become relatively large. Accordingly, in those cases where the pretreatment liquid B containing a coagulant is used, the use of a serial-type inkjet recording apparatus is preferred.

In the case of a serial system, the permeation rate into the substrate of the pretreatment liquid that lands on the substrate first may easily be increased, the pretreatment liquid that lands on the substrate later may also permeate readily into the substrate, and the ink may be more easily aggregated within the interior of the substrate, meaning an anchoring effect may be more easily obtained.

In some embodiments, from the viewpoints of improving the fixability and improving the image density uniformity, the pretreatment liquid A and the pretreatment liquid B are preferably jetted so as to land on the substrate in a fixed order.

Specifically, a method may be used in which the pretreatment liquid A is jetted onto the substrate first, and the pretreatment liquid B is jetted on thereafter, so that the pretreatment liquid A and the pretreatment liquid B land on the substrate in this order. Alternatively, a method may be used in which the pretreatment liquid B is jetted onto the substrate first, and the pretreatment liquid A is jetted on thereafter, so that the pretreatment liquid B and the pretreatment liquid A land on the substrate in this order.

By ensuring that the pretreatment liquid A and the pretreatment liquid B land on the substrate in a fixed order across the entire surface of the recording region of the substrate to which the aqueous ink is to be applied, variations in the permeability of the ink into the substrate may be suppressed. For example, in the case of a serial system, the productivity can be improved by performing bidirectional printing. On the other hand, when bidirectional printing is conducted in a serial system, if the landing order of the two pretreatment liquids varies between the outward path and the return path, then the permeation of the ink into the substrate is likely to be affected. This is described, for example, in the case where the pretreatment liquid B causes aggregation of the ink, but does not cause aggregation of the pretreatment liquid A.

In those cases where the pretreatment liquid A lands on the substrate first and the pretreatment liquid B lands on the substrate second, the ink and the pretreatment liquid B may make direct contact on the substrate surface, whereby aggregation of the ink may tend to occur readily on the substrate surface. As a result, the ink may be more readily retained at the substrate surface, and the image density may tend to increase. On the other hand, in those cases where the pretreatment liquid B lands on the substrate first and the pretreatment liquid A lands on the substrate second, the pretreatment liquid B may be forced into the interior of the substrate by the subsequent landing of the pretreatment liquid A on the substrate, and the ink may also permeate to a depth within the substrate where it is able to contact the coagulant, meaning that compared with the case where the pretreatment liquid A lands on the substrate first and the pretreatment liquid B lands on the substrate second, the image density may tend to be lower. If these two cases are exist together, then this may cause a deterioration in the fixability and non-uniformity in the image density.

On the other hand, when the pretreatment liquid A and the pretreatment liquid B land on the substrate in a fixed order, fluctuations in the permeability of the ink into the substrate may be reduced. As a result, the fixability may be improved, and the uniformity of the image density may also be improved.

The pretreatment liquid A and the pretreatment liquid B may be jetted so as to land on the substrate in a fixed order. There are no restrictions on the order, although from the viewpoint of improving the image density uniformity, jetting is preferably performed so that the pretreatment liquid A lands on the substrate first, followed by the pretreatment liquid B.

If the pretreatment liquid A lands on the substrate first, then the pretreatment liquid B that lands on the substrate thereafter and the ink may undergo aggregation more readily at the substrate surface, and therefore the image density may tend to increase, and the image density uniformity may be more easily improved.

In those cases where, in step 1, the pretreatment liquid A and the pretreatment liquid B are jetted so that the pretreatment liquid A lands on the substrate first, followed by the pretreatment liquid B, the method for producing printed matter preferably also includes, prior to step 1, applying a pretreatment liquid P containing a coagulant to the substrate, which is described below.

There are no particular limitations on the method used for jetting the pretreatment liquid A and the pretreatment liquid B so as to land on the substrate in a fixed order. For example, the methods described below in an example that uses a serial-type inkjet system and an example that uses a line head inkjet system may be used.

In some embodiments, it is preferable that for at least the pretreatment liquid that lands on the substrate first among the pretreatment liquid A and the pretreatment liquid B, at least one of the landing time difference $\Delta T_X$ (hereafter referred to as either the "landing time difference $\Delta T_X$" or simply "$\Delta T_X$") between the two dots which are arranged along the main scanning direction and for which the distance between the dots reaches a shortest value among any two dots arranged along the main scanning direction, and the landing time difference $\Delta T_Y$ (hereafter referred to as either the "landing time difference $\Delta T_Y$" or simply "$\Delta T_Y$") between the two dots which are arranged along a direction that intersects the main scanning direction and for which the distance between the dots reaches a shortest value among any two dots arranged along a direction that intersects the main scanning direction, is at least 10 ms (milliseconds).

If the pretreatment liquid that lands on the substrate first among the pretreatment liquid A and the pretreatment liquid B is termed the pretreatment liquid E, then, if, among the dots of the pretreatment liquid E, the two dots which are arranged along the main scanning direction and for which the distance between the dots reaches a shortest value among any two dots of the pretreatment liquid E arranged along the main scanning direction are termed the dot $E_{X1}$ and the dot $E_{X2}$, then the landing time difference between the dot $E_{X1}$ and the dot $E_{X2}$ is the landing time difference $\Delta T_X$. Further, if, among the dots of the pretreatment liquid E, the two dots which are arranged along a direction that intersects the main scanning direction and for which the distance between the dots reaches a shortest value among any two dots of the pretreatment liquid E arranged along a direction that intersects the main scanning direction are termed the dot $E_{Y1}$ and the dot $E_{Y2}$, then the landing time difference between the dot $E_{Y1}$ and the dot $E_{Y2}$ is the landing time difference $\Delta T_Y$ for the pretreatment liquid E. It is preferable that at least one of the landing time difference $\Delta T_X$ and the landing time difference $\Delta T_Y$ for the pretreatment liquid E, namely the landing time difference $\Delta T_X$, the landing time difference $\Delta T_Y$, or both the landing time difference $\Delta T_X$ and the landing time difference $\Delta T_Y$, is at least 10 ms.

In those cases where, for the dots of the pretreatment liquid that lands on the substrate first among the pretreatment liquid A and the pretreatment liquid B, at least one of $\Delta T_X$ and $\Delta T_Y$ (the landing time difference $\Delta T$) is at least 10 ms, the permeability of the two pretreatment liquids may be improved, an anchoring effect may be more easily obtained for the ink coating film, and the fixability of the image may be improved.

In this description, the "main scanning direction" (hereafter also referred to as the "main scanning direction X") is the direction along which dots are jetted continuously, and is the main scanning direction of the recording head in a serial system, or the lengthwise direction of the recording head in a line head system. Further, a "direction that intersects the main scanning direction" (hereafter also referred to as a "direction Y") may be any direction that intersects the main scanning direction along which dots are jetted continuously, and may be a direction that intersects the main scanning direction perpendicularly, or a direction that intersects the main scanning direction at an angle other than a right angle. In a typical inkjet recording apparatus, the substrate is transported in a direction orthogonal to the main scanning direction X, and the two dots for which the distance between the dots reaches a shortest value may land on the substrate along a direction orthogonal to the main scanning direction X.

Resins may tend to exhibit poor permeability, and for example, water-dispersible resins may tend to permeate poorly in particulate form, whereas water-soluble resins may thicken upon volatilization of water and may tend to lose permeability. However, in those cases where the landing time difference $\Delta T$ is at least 10 ms, even when a pretreatment liquid containing a resin is used, the permeability of the two pretreatment liquids may be enhanced.

The landing time difference $\Delta T$ is preferably at least 10 ms, more preferably at least 20 ms, and even more preferably 100 ms or greater.

On the other hand, the landing time difference $\Delta T$ is preferably not longer than 30 s (seconds), more preferably not longer than 5 s, and even more preferably 3 s or less. If the landing time difference $\Delta T$ is not longer than 30 s, then drying and/or film formation of the pretreatment liquid that lands on the substrate first may be less likely to start, and favorable permeability may be obtained.

For example, the landing time difference $\Delta T$ is preferably within a range from 10 ms to 5 s, and more preferably from 20 ms to 3 s.

At least one of the landing time differences $\Delta T_X$ and $\Delta T_Y$ may be at least 10 ms, or both may be at least 10 ms. The preferred range for each of the landing time differences $\Delta T_X$ and $\Delta T_Y$ is the same as that described above for $\Delta T$.

There are no particular limitations on the method used for ensuring that the landing time difference $\Delta T$ is at least 10 ms. For example, jetting may be performed using a serial system.

When jetting is performed using a serial system, for example, the landing time difference $\Delta T_X$ between the two dots which are arranged along the main scanning direction X and for which the distance between the dots reaches a shortest value among any two dots arranged along the main scanning direction X may be set to 10 ms or greater. In this case, for example, the speed of movement of the serial-type recording head in the main scanning direction X may be controlled to adjust the value of $\Delta T_X$ to at least 10 ms. Alternatively, the landing position of the serial-type recording head in the main scanning direction X may be controlled to achieve at least a prescribed distance, thereby adjusting the value of $\Delta T_X$ to at least 10 ms. A combination of these methods may also be used.

When jetting is performed using a serial system, for example, the landing time difference $\Delta T_Y$ between the two dots which are arranged along a direction Y that intersects the main scanning direction for which the distance between the dots reaches a shortest value among any two dots arranged along a direction Y that intersects the main scanning direction may be set to 10 ms or greater. In this case, for example, using a serial-type inkjet recording apparatus in which the substrate is transported in a direction orthogonal to the main scanning direction, the pretreatment liquid may be jetted along a first line while the serial-type recording head is scanned across the main scanning direction X, the substrate may then be moved a distance of one line in the transport direction, and, thereafter, a second line of the pretreatment liquid may be jetted onto the substrate in a similar manner. In such a case, by controlling the transport speed of the substrate and the movement speed of the recording head and the like, the landing time difference $\Delta T_Y$ may be adjusted to a value of at least 10 ms.

The landing time difference $\Delta T_X$ and the landing time difference $\Delta T_Y$ described above may be controlled individually, or in combination.

The landing time difference $\Delta T_X$ between the two dots which are arranged along the main scanning direction and for which the distance between the dots reaches a shortest value among any two dot arranged along the main scanning direction, and the landing time difference $\Delta T_Y$ between the two dots which are arranged along a direction that intersects the main scanning direction and for which the distance between the dots reaches a shortest value among any two dot arranged along a direction that the main scanning direction can be calculated, for example, from the jetting speed of the inkjet liquid droplets, the transport speed or serial drive speed, and the jetting order.

For example, in those cases where a serial-type recording head is used, the landing time difference $\Delta T_X$ may be generally substantially the same as the jetting interval between the two liquid droplets jetted consecutively from the nozzle section of the recording head that yield the two dots having the shortest distance therebetween.

In those cases where a serial-type recording head is used, if the recording head jets the pretreatment liquid in both directions (in the outward and return paths), then, for example, the recording head may jet the pretreatment liquid along a first line on the substrate on the outward path, the substrate may then be moved a distance of one line in the transport direction, and, thereafter, the recording head may jet the pretreatment liquid along a second line on the substrate on the return path. In such a case, the landing time difference between adjacent dots in the direction Y that intersects the main scanning direction may typically reach a minimum close to the turning point at the edge of the main scanning direction X of the recording head. Accordingly, in this type of configuration, the landing time difference $\Delta T_Y$ may be substantially the same as the time taken to transport the substrate one line.

In those cases where a serial-type recording head is used, if the recording head only jets the pretreatment liquid in one direction, then, for example, the recording head may jet the pretreatment liquid along a first line on the substrate on the outward path, the recording head may then be returned to the start point of the outward path without jetting the pretreatment liquid, while the substrate is moved a distance of one line in the transport direction, and the recording head may then jet the pretreatment liquid along a second line on the substrate on the outward path. In such a case, the shorter of the time taken to move the substrate a distance of one line in the transport direction, and the time taken to return the recording head along the return path to the start point of the outward path may be substantially the same as the landing time difference $\Delta T_Y$.

In the case of a line head-type recording head, liquid droplets may be jetted from the line-shaped recording head while the substrate is moved along the transport direction, and therefore the jetting interval between liquid droplets in the substrate transport direction and $\Delta T_Y$ may be substantially the same. Further, in a line head-type recording head, in a typical jetting method, because the liquid droplets may land on the substrate in the main scanning direction X with substantially the same timing, ensuring that the landing time difference $\Delta T_Y$ is at least 10 ms may be a simpler control method, and may therefore be preferred.

It is more preferable that for both the pretreatment liquid A and the pretreatment liquid B, at least one of the landing time difference $\Delta T_X$ and the landing time difference $\Delta T_Y$ (the landing time difference $\Delta T$) is at least 10 ms. In other words, the landing time difference $\Delta T$ for the pretreatment liquid that lands on the substrate first, and the landing time difference $\Delta T$ for the pretreatment liquid that lands on the substrate later are preferably both at least 10 ms. However, a configuration in which the landing time difference $\Delta T$ for the pretreatment liquid that lands on the substrate first is at least 10 ms, but the landing time difference $\Delta T$ for the pretreatment liquid that lands on the substrate later is less than 10 ms may also be used.

The pretreatment liquid A and the pretreatment liquid B are preferably applied to at least the recording region to which the ink is to be applied. For example, the pretreatment liquid A and the pretreatment liquid B may be applied only to the recording region to which the aqueous ink is to be applied, or may also be applied to regions outside the recording region for the aqueous ink. The pretreatment liquid A and the pretreatment liquid B may be applied to a portion, including the recording region, of the substrate, or the entire surface of the substrate.

There are no particular limitations on the amounts of the pretreatment liquids A and B applied to the substrate. For example, in those cases where a fabric is used as the substrate, the amounts applied of the pretreatment liquids A and B, each expressed independently as a non-volatile fraction amount per unit of applied surface area, are each preferably within a range from 0.1 g/m² to 50 g/m², more preferably from 1 g/m² to 20 g/m², and even more preferably from 2 g/m² to 20 g/m².

Next is a description of step 2. After application of the pretreatment liquid A and the pretreatment liquid B, in step 2, an aqueous inkjet ink is applied to the substrate using an inkjet system.

There are no particular limitations on the system used for jetting the aqueous inkjet ink in step 2, provided the system is an inkjet system. Either a line head system or a serial system may be used, but a serial system is preferred.

Step 1 and step 2 are preferably both performed using the same inkjet recording apparatus.

There are no particular limitations on the amount of ink applied to the substrate, but for example, in the case where a fabric is used as the substrate, from the viewpoint of the resulting texture, the amount of the ink, expressed as a non-volatile fraction amount per unit surface area of the fabric, is preferably within a range from 0.1 g/m² to 50 g/m², more preferably from 1 g/m² to 30 g/m², and even more preferably from 2 g/m² to 20 g/m².

The inkjet recording apparatus used in step 1 and/or step 2 may use any of various systems, including a piezo system, electrostatic system or thermal system, and for example, a system that is capable of jetting liquid droplets of the ink and/or pretreatment liquid from the recording head based on a digital signal, and then adhering the jetted liquid droplets to the substrate is preferred.

Step 1 and step 2 are described below in further detail using an example that employs a serial-type inkjet system and an example that employs a line head-type inkjet system.

In general, a serial-type inkjet recording apparatus may contain a serial-type recording head that contains a nozzle portion and that is fitted so as to be able to move along the main scanning direction X, and a transport device that transports the substrate to a position facing the recording head. By repeating an operation in which ink is jetted from the nozzle portion while the serial-type recording head is moved along the main scanning direction X, and an operation in which the substrate is moved in a transport direction Y that intersects the main scanning direction, an image may be recorded on the substrate.

One example of a serial-type inkjet recording apparatus is described below. In this example, the serial-type inkjet recording apparatus contains a recording head unit that can be moved along the main scanning direction X, and a transport device that transports the substrate in the transport direction Y. The recording head unit contains at least a first recording head, a second recording head and a third recording head. The recording head unit can be moved back and forth along the main scanning direction X by a drive belt. In this example, one of the pretreatment liquid A and the pretreatment liquid B is supplied to the first recording head, the other of the pretreatment liquid A and the pretreatment liquid B is supplied to the second recording head, the aqueous ink is supplied to the third recording head, so that each of the pretreatment liquid A, the pretreatment liquid B and the aqueous ink may be jetted from the respective recording head. In this manner, the three liquids may be layered on the substrate to record an image.

The substrate transport device may be a device in which the recording head unit is fixed to the inkjet recording apparatus, and a transport roller or the like is used to move the substrate along the transport direction Y so as to pass the position facing the recording head unit. Alternatively, the substrate transport device may be a device in which the substrate is fixed and mounted to a mounting section, and the recording head unit is moved so that the substrate is moved relatively in the transport direction Y. It is preferable that the substrate is transported in a direction orthogonal to the main scanning direction of the recording head unit.

The recording apparatus may also contain a heating device for heating the substrate at an arbitrary stage during printing, or before or after printing. By heating the substrate with the heating device, drying of each of the pretreatment liquids and the aqueous ink applied to the substrate may be accelerated. Further, in those cases where any one or more of the pretreatment liquids and the aqueous ink contains a resin component, formation of a resin film may also be promoted.

The recording apparatus may also contain an input device for inputting the image data that is to be printed. The input device may include an external input unit for receiving image data from a scanner or a computer. Based on this image data, jetting of the aqueous ink from the recording head can be controlled, and each of the pretreatment liquids can be jetted in advance onto the recording region onto which the aqueous ink is to be jetted.

In some embodiments, the serial-type inkjet recording apparatus has, for example, a serial-type recording head unit containing a first recording head to which one of the pretreatment liquid A and the pretreatment liquid B is supplied, a second recording head to which the other of the pretreatment liquid A and the pretreatment liquid B is supplied, and a third recording head to which the aqueous ink is supplied. Using this recording apparatus, a step of applying one of the pretreatment liquid A and the pretreatment liquid B from the first recording head to the recording region of the substrate, a step of applying the other of the pretreatment liquid A and the pretreatment liquid B from the second recording head to the recording region of the substrate, and a step of applying the aqueous ink from the third recording head to the recording region of the substrate can be performed in this order. Using this recording apparatus, one of the pretreatment liquid A and the pretreatment liquid B, the other of the pretreatment liquid A and the pretreatment liquid B, and the aqueous ink may be layered on the substrate in this order, and, in this way, printed matter having an image may be obtained in which the pretreatment liquid A and the pretreatment liquid B have landed on the substrate in a fixed order.

In one specific method, the first recording head, the second recording head and the third recording head are positioned in this order along the main scanning direction of the recording head unit, and one of the pretreatment liquid A and the pretreatment liquid B is jetted from the first recording head, the other of the pretreatment liquid A and the pretreatment liquid B is jetted from the second recording head, and the aqueous ink is jetted from the third recording head, thereby applying the three liquids to the recording region of the substrate in this order, while the recording head unit is moved in one direction along the main scanning direction.

FIG. 1 is a top view schematically illustrating one example of a serial-type recording head unit.

In the recording head unit 100 illustrated in FIG. 1, a first recording head 11, a second recording head 12 and a third recording head 13 are disposed in this order in a linear arrangement along the main scanning direction X from the downstream side of the outward path (left to right in the drawing, this may also apply below). The third recording head 13 contains four recording heads composed of a black recording head 13K, a cyan recording head 13C, a magenta recording head 13M and a yellow recording head 13Y, which are used for jetting the four aqueous ink colors of black (K), cyan (C), magenta (M) and yellow (Y) respectively. The reference signs 13K, 13C, 13M, 13Y and 100 are also used below with the same meanings in FIG. 2 and FIG. 4.

The pretreatment liquid A is supplied to the first recording head 11, the pretreatment liquid B is supplied to the second recording head 12, the aqueous inks are supplied to the third recording heads 13, and, by jetting the pretreatment liquid A from the first recording head 11, jetting the pretreatment liquid B from the second recording head 12, and jetting the aqueous inks from the third recording heads 13, while the recording head unit 100 is moved in the outward path direction along the main scanning direction X, the pretreatment liquid A, the pretreatment liquid B and the aqueous inks may be applied to the substrate in this order. In other words, the pretreatment liquid A and the pretreatment liquid B may land on the substrate in this order.

With this configuration of the recording head unit 100, this application order applies only for the outward path along the main scanning direction X, and the application order reverses along the return path. Accordingly, in order to achieve the above application order, printing is preferably performed with jetting performed only on the outward path, and no jetting performed on the return path.

In this method, when application is performed only on the outward path, with no application on the return path, a landing time difference between dots of at least 10 ms may be achieved between adjacent lines in the transport direction Y. Accordingly, in this method, at least the landing time difference $\Delta T_Y$ may be controlled to a value of at least 10 ms.

In another specific method, the first recording head and the second recording head are disposed in a linear arrangement along the main scanning direction of the recording head unit, and the third recording head is positioned downstream in the substrate transport direction from the first recording head and the second recording head, and a step of applying one of the pretreatment liquid A and the pretreatment liquid B from the first recording head to the recording region of the substrate and a step of applying the other of the pretreatment liquid A and the pretreatment liquid B from the second recording head to the recording region of the substrate are performed in this order, the substrate is then moved along the substrate transport direction relative to the recording head unit, and a step of applying the aqueous ink from the third recording head to the recording region of the substrate that has already been treated with the pretreatment liquid A and the pretreatment liquid B may then be performed.

Figure 2:
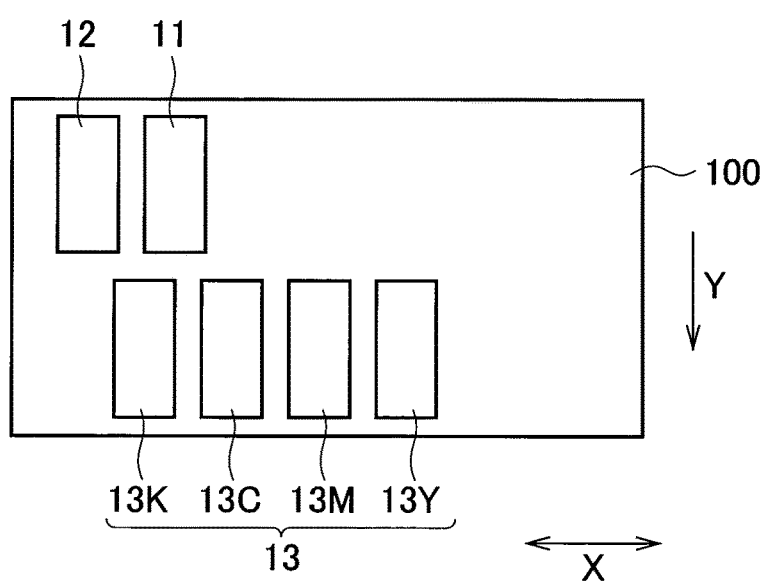
FIG. 2 is a top view schematically illustrating another example of a serial-type recording head unit.

FIG. 2 is a top view schematically illustrating another example of a serial-type recording head unit.

In FIG. 2, the recording head unit 100 includes a first head array containing a first recording head 11 to which the pretreatment liquid A is supplied and a second recording head 12 to which the pretreatment liquid B is supplied arranged along the main scanning direction X of the recording head unit 100, and a second head array containing a third recording head 13 to which the aqueous inks are supplied disposed downstream from the first head array in the substrate transport direction Y.

By repeating an operation in which the pretreatment liquid A is jetted from the first recording head 11 and the pretreatment liquid B is jetted from the second recording head 12, and an operation in which the substrate is moved in the transport direction Y, and the aqueous inks are then jetted from the third recording head 13 onto the recording region on the substrate to which the pretreatment liquid A and the pretreatment liquid B have been applied, while the recording head unit 100 is moved along the main scanning direction X, the pretreatment liquid A, the pretreatment liquid B and the aqueous inks may be applied to the substrate in this order.

With this configuration of the recording head unit 100, this application order applies only for the outward path along the main scanning direction X (left to right in the drawing), and the application order reverses along the return path. Accordingly, in order to achieve the above application order, printing is preferably performed with application performed only on the outward path, and no application performed on the return path.

In this method, when application is performed only on the outward path, with no application on the return path, a landing time difference between dots of at least 10 ms may be achieved between adjacent lines in the transport direction Y. Accordingly, in this method, at least the landing time difference $\Delta T_Y$ may be controlled to a value of at least 10 ms.

Figure 3:
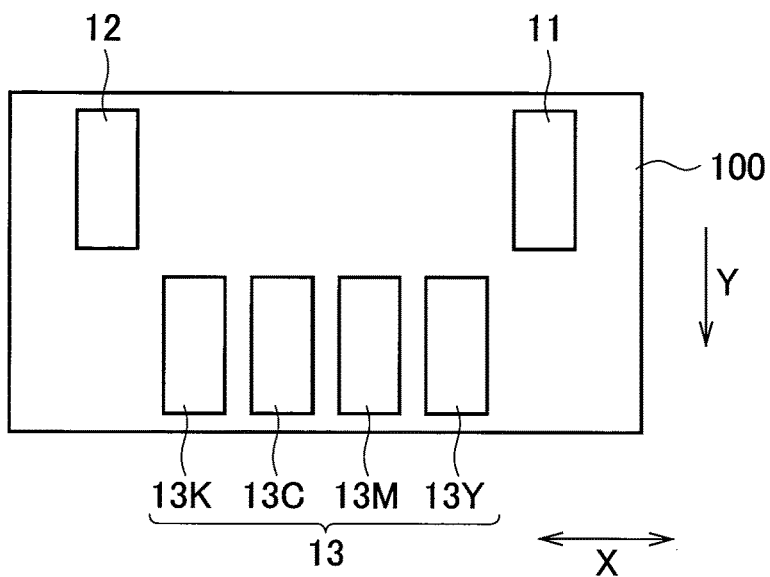
FIG. 3 is a top view schematically illustrating another example of a serial-type recording head unit.

FIG. 3 is a top view schematically illustrating yet another example of a serial-type recording head unit.

FIG. 3 illustrates an example in which the arrangement of the first recording head 11 and the second recording head 12 differs from that illustrated above in FIG. 2. In FIG. 3, the first recording head 11 and the second recording head 12 are arranged distant from each other. The first recording head 11 and the second recording head 12 are preferably separated by at least the width of one recording head, and more preferably separated by at least the width of two recording heads. More specifically, the first recording head 11 is positioned at one side of the recording head unit 100 in the main scanning direction X, and the second recording head 12 positioned at the other side of the recording head unit in the main scanning direction X. It is more preferable that the first recording head 11 and the second recording head 12 are disposed so as not to overlap in the transport direction Y with the third recording head 13 that jets the aqueous inks.

By using this type of arrangement, the mist containing the coagulant of the pretreatment liquid B may be prevented from adhering to the nozzles jetting the pretreatment liquid A and the nozzles jetting the aqueous inks. As a result, nozzle blockages in the first recording head 11 and the third recording head 13 may be better prevented.

In this method, similarly to the apparatus of FIG. 2 as described above, when application is performed only on the outward path, with no application on the return path, at least the landing time difference $\Delta T_Y$ may be controlled to a value of at least 10 ms.

In the recording head units illustrated in FIG. 1 to FIG. 3, the pretreatment liquid B may also be supplied to the first recording head 11 and the pretreatment liquid A supplied to the second recording head 12, so that the pretreatment liquid B is jetted from the first recording head 11 and the pretreatment liquid A is jetted from the second recording head 12.

In those cases where jetting is performed on both the outward path and the return path of a serial-type recording head unit, if a conventional recording method is used, then the jetting order for the two pretreatment liquids and the aqueous inks may reverse between the outward path and the return path of the recording head unit, and therefore the layering order for the two pretreatment liquids on the substrate may be reversed for each adjacent line in the transport direction Y of the substrate. An explanatory diagram for describing this conventional recording method is illustrated in FIG. 4.

Figure 4:
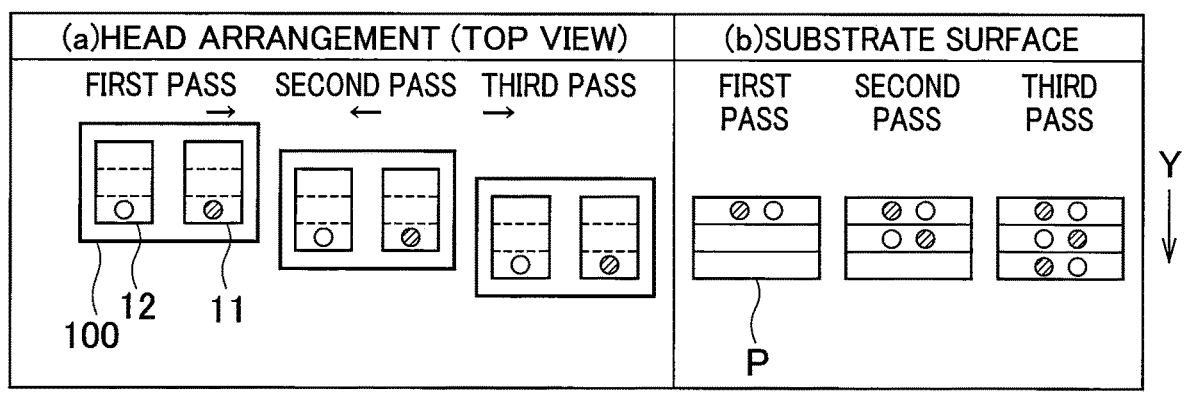
FIG. 4 is an explanatory diagram describing a recording method of a conventional example using a serial-type recording head unit.

In FIG. 4, (a) illustrates the arrangement of the recording head unit 100 from the top view, and for each pass, the case where the pretreatment liquid A is jetted from the first recording head 11 is indicated with a hatched circle, and the case where the pretreatment liquid B is jetted from the second recording head 12 is indicated by a white circle. Further, (b) illustrates the substrate surface from the top view, and for each line along the main scanning direction of the recording head unit 100, those cases where the pretreatment liquid A and the pretreatment liquid B are layered in this order are indicated by a hatched circle and then a white circle in this order from the left side of the drawing, whereas those cases where the opposite layering occurs are indicated by a white circle and then a hatched circle in this order from the left side of the drawing.

In FIG. 4, as illustrated in (a) in the drawing, in the first pass along the outward path, because the first recording head 11 moves ahead of the second recording head 12, the pretreatment liquid A is jetted onto the substrate first, followed by the pretreatment liquid B. Accordingly, as illustrated in (b) in the drawing, the pretreatment liquid A and the pretreatment liquid B are layered in this order on top of the substrate.

In the second pass along the return path, because the second recording head 12 moves ahead of the first recording head 11, the pretreatment liquid B is jetted onto the substrate first, followed by the pretreatment liquid A, and the pretreatment liquid B and the pretreatment liquid A are layered in this order on top of the substrate.

In the third pass in the outward direction, in the same manner as the first pass, the pretreatment liquid A and the pretreatment liquid B are layered in this order on top of the substrate.

In the obtained printed matter, the layering order of the two pretreatment liquids reverses in each adjacent line in the substrate transport direction. In this manner, when the landing order of the two pretreatment liquids is not fixed, the uniformity in the permeability of the ink into the substrate may sometimes be lowered, and the fixability of the image in the printed matter may sometimes be lowered.

In some embodiments, it is preferable that the first recording head is provided on the downstream side of the outward path along the main scanning direction X of the recording head unit and the second recording head is provided on the upstream side of the outward path along the main scanning direction X of the recording head unit, and when the recording head unit is moved along the outward path, the pretreatment liquid A is first jetted from the first recording head, and the pretreatment liquid B is then jetted from the second recording head, whereas when the recording head unit is moved along the return path, neither the pretreatment liquid A nor the pretreatment liquid B is jetted. In this way, the pretreatment liquid A and the pretreatment liquid B may be layered in this order across the entire surface of the substrate recording region. In other words, in FIG. 4, it is preferable that only the jetting of the first pass along the outward path is repeated, while no jetting is performed on the second pass along the return path. Alternatively, in FIG. 4, by not performing jetting during the first pass and the third pass along the outward path, and repeating only the jetting performed during the second pass along the return path, the pretreatment liquid B and the pretreatment liquid A may be layered in this order on the substrate.

In those cases where the recording head units 100 illustrated in any of FIG. 2 and FIG. 3 are used, once the pretreatment liquid A and the pretreatment liquid B have been layered onto the substrate, the substrate may be transported so that the third recording head 13 reaches the position facing the region to which each of the pretreatment liquids has been applied, and the aqueous inks may then be jetted from the third recording head 13, thereby forming an image.

A serial-type inkjet recording apparatus may be used to apply the pretreatment liquid A and the pretreatment liquid B along both the outward path and the return path. When this method is used, the productivity may be enhanced compared with the case where the pretreatment liquid A and the pretreatment liquid B are jetted only during one of the outward path and the return path of the main scanning direction, and are not jetted in the other direction. In the following description, there are no particular limitations on the order of movement along the outward path and the return path of the main scanning direction, and the outward path and the return path may occur in the reverse order. In the following description, the application order for the pretreatment liquid A and the pretreatment liquid B may be reversed.

One example of a bidirectional recording method is a method that uses a recording head unit in which a first recording head and second recording head are arranged along the main scanning direction X, wherein the pretreatment liquid A is applied to the substrate from the first recording head during the outward path along the main scanning direction, and then during the return path along the main scanning direction, the pretreatment liquid B is applied to the substrate from the second recording head so as to overlap the pretreatment liquid A applied during the outward path.

In the example illustrated in FIG. 1, further, while the recording head unit is moved along the outward path of the main scanning direction, the aqueous inks may be applied to the substrate from the third recording head so as to overlap the pretreatment liquid B. In the examples illustrated in FIG. 2 and FIG. 3, following application of the pretreatment liquid B, the substrate may be moved in the transport direction Y, and the aqueous inks may be applied from the third recording head so as to overlap the pretreatment liquid B, while the recording head unit is moved along the main scanning direction.

In another example of a bidirectional recording method, a recording head unit may be used in which a first recording head is disposed on the upstream side in the substrate transport direction Y and a second recording head is disposed downstream of the first recording head, wherein during the outward path along the main scanning direction X, the pretreatment liquid A may be applied to the substrate from the first recording head, the substrate may then be moved in the transport direction, and during the return path along the main scanning direction, the pretreatment liquid B may be applied to the substrate from the second recording head so as to overlap the pretreatment liquid A.

In order to enable more efficient application of the two pretreatment liquids, during the return path along the main scanning direction, while the pretreatment liquid B is applied to the substrate from the second recording head, the pretreatment liquid A may also be applied to the substrate from the first recording head. Similarly, during the outward path along the main scanning direction, while the pretreatment liquid A is applied to the substrate from the first recording head, the pretreatment liquid B may also be applied to the substrate from the second recording head.

In a configuration in which the first recording head and the second recording head are arranged along the transport direction, by using a recording head unit in which a third recording head is disposed further downstream in the transport direction from the second recording head, once the pretreatment liquid B has been applied, the substrate may be moved in the transport direction, and aqueous inks may then be applied to the substrate from the third recording head, so as to overlap the pretreatment liquid B, while the recording head unit is moved along the main scanning direction.

In yet another example of a bidirectional recording method, a recording head unit may be used in which a first recording head and a second recording head are arranged along the main scanning direction X, and in each of the first recording head and the second recording head, a plurality of nozzles are formed in an array along the substrate transport direction Y. While this recording head unit is moved back and forth across the main scanning direction and the substrate is moved along the transport direction, the pretreatment liquid A may be applied to the substrate from the nozzles of the first recording head on the upstream side in the transport direction to form a plurality of lines, the substrate may be moved consecutively along the transport direction, and the pretreatment liquid B may be applied from the nozzles of the second recording head on the downstream side in the transport direction so as to overlap the pretreatment liquid A previously applied by the upstream nozzles of the first recording head, thus enabling the formation of a plurality of lines having the pretreatment liquid A and the pretreatment liquid B layered in this order.

In the example illustrated in FIG. 1, by using a third recording head in which a plurality of nozzles are formed in an array along the transport direction, aqueous inks can be applied to the substrate from nozzles of the third recording head that are positioned even further downstream in the transport direction than the nozzles of the second recording head, thereby overlapping with the pretreatment liquid B applied from nozzles positioned further upstream in the transport direction.

In the examples illustrated in FIG. 2 and FIG. 3, the pretreatment liquid B may be applied, the substrate may then be moved in the transport direction Y, and the aqueous inks may then be applied from the third recording head so as to overlap with the pretreatment liquid B, while the recording head unit is moved across the main scanning direction.

In one example of a specific method, in any of the recording head units illustrated in FIG. 1 to FIG. 3, by using a configuration in which a plurality of nozzles are formed in an array along the substrate transport direction Y for each of the first recording head 11 and the second recording head 12, bidirectional application may be performed. In each of the recording heads, the plurality of nozzles are arranged with mutual separation in the transport direction Y.

First, the recording head unit 100 is moved along the outward path of the main scanning direction X while liquid droplets of the pretreatment liquid A, each corresponding with a single dot, are jetted from one nozzle of the first recording head 11 at the upstream side in the substrate transport direction Y, thereby causing consecutive landing of dots along the main scanning direction X to form a line of the pretreatment liquid A with a width of one dot. Subsequently, the substrate is moved in the transport direction Y, and another line of the pretreatment liquid A is formed similarly to the above line of the pretreatment liquid A, in such a manner that liquid droplets are jetted from one nozzle adjacent to, and on the downstream side in the transport direction Y relative to, the above one nozzle of the first recording head 11 so as to land on the substrate at a portion adjacent to, and on the upstream side in the substrate transport direction Y relative to, the previously formed line of the pretreatment liquid A. In such a case, for example, the landing time difference $\Delta T_Y$ on the substrate between two dots that are adjacent in the substrate transport direction Y may be adjusted to a value of at least 10 ms by, for example, controlling the time taken to move the recording head unit in the transport direction Y, the movement speed of the recording head unit, and the time taken to turn the movement direction of the recording head unit and the like.

Of the plurality of nozzles of the first recording head, two or more nozzles positioned consecutively along the transport direction Y may be used to apply two or more lines of the pretreatment liquid A in a single pass, with the lines separated by a distance corresponding with the spacing between the nozzles in the transport direction Y, and then, in a similar manner to that described above, apply additional lines of the pretreatment liquid A on the upstream side in the substrate transport direction Y of the previously formed lines of the pretreatment liquid A. In this method, the amount of image recording that can be conducted in a single pass of the recording head unit may be increased, enabling the productivity to be further enhanced.

Subsequently, the pretreatment liquid B may be jetted from the nozzles of the second recording head 12 and onto the substrate to form dots that overlap with the dots of the pretreatment liquid A that have already landed on the substrate.

For example, for a recording region of one line, the pretreatment liquid A may be applied by jetting from a nozzle of the first recording head 11 on the upstream side in the substrate transport direction Y, the substrate may then be moved in the transport direction Y, and the pretreatment liquid B may be applied by jetting from a nozzle of the second recording head 12 that is positioned on the downstream side in the substrate transport direction Y relative to the position of the above nozzle of the first recording head 11.

Next, in the example illustrated in FIG. 1, a third recording head having a plurality of nozzles formed in an array along the transport direction may be used, the substrate may be transported in the substrate transport direction Y, and aqueous inks may be jetted from nozzles of the third recording head that are positioned even further downstream side in the transport direction than the above nozzles of the second recording head, with the aqueous inks landing on the substrate and forming dots that overlap the previously formed dots of the overlapped pretreatment liquid A and pretreatment liquid B.

In the examples illustrated in FIG. 2 and FIG. 3, the substrate may be transported in the substrate transport direction Y, and aqueous inks may be jetted from the third recording heads 13 so as to land on the substrate and form dots that overlap the previously formed dots of the overlapped pretreatment liquid A and pretreatment liquid B.

By repeating the operations described above, the pretreatment liquid A, the pretreatment liquid B and the aqueous inks may be applied to the substrate in this order, and the pretreatment liquid A and the pretreatment liquid B are able to land on the substrate in a fixed order.

In the bidirectional printing described above, in those cases where images having a resolution that is N times that of the resolution of the recording head are to be recorded, N lines may be formed in the region corresponding with the spacing between adjacent nozzles in the substrate transport direction Y. Here, N represents a positive integer.

Specifically, when images of 1200 dpi are to be recorded using a 300 dpi recording head, four dots may be formed in the region corresponding with the spacing between adjacent nozzles of the recording head in the substrate transport direction Y. Accordingly, four lines may be formed in the region corresponding with the spacing between adjacent nozzles in the substrate transport direction.

The line head-type inkjet recording method may use a line head-type recording head, which is positioned across a width direction of the substrate that intersects, and is preferably orthogonal to, the substrate transport direction, and is provided with an array of a plurality of nozzles across the substrate width direction.

One example of a line head-type inkjet recording apparatus contains a transport device that transports the substrate along the transport direction Y, and at least three recording heads that are disposed in a linear arrangement along a direction X that intersects the substrate transport direction Y. In this example, the at least three recording heads may include, for example, a first recording head from which the pretreatment liquid A is supplied, a second recording head from which the pretreatment liquid B is supplied, and a third recording head from which the aqueous inks are supplied, in this order from the upstream side along the substrate transport direction Y. By jetting the pretreatment liquid A, the pretreatment liquid B and the aqueous inks from the respective nozzle arrays, images can be recorded in which these three liquids are layered on the substrate in this order. The pretreatment liquid B may be supplied to the first recording head and the pretreatment liquid A may be supplied to the second recording head, so that the application order of the pretreatment liquid A and the pretreatment liquid B is reversed.

In a line head-type inkjet recording apparatus, by determining the alignment order of the recording heads that supply the two pretreatment liquids and the aqueous inks, the order in which the two pretreatment liquids and the aqueous inks are applied to the substrate can be determined. In this manner, the pretreatment liquid A and the pretreatment liquid B can be jetted so as to land on the substrate in a fixed order.

In a line head-type inkjet recording method, the landing time difference $\Delta T_Y$ between two dots that are adjacent in the substrate transport direction Y can be adjusted to a value of at least 10 ms by controlling the jetting interval from the recording head, and the substrate transport time and the like.

The method for producing printed matter may also include, prior to step 1, applying a pretreatment liquid P containing a coagulant to the substrate (hereafter sometimes referred to as "step P").

For example, the method for producing printed matter is preferably a method in which, in step 1, the pretreatment liquid A and the pretreatment liquid B are jetted so as to land on the substrate in an order of the pretreatment liquid A followed by the pretreatment liquid B, and prior to step 1, step P is performed. In this case, the resin contained in the pretreatment liquid A is preferably a water-dispersible resin.

In those cases where a substrate having many gaps such as a knitted fabric is used as the substrate, from the viewpoint of more easily obtaining the desired image, it is preferable that the pretreatment liquid A and the pretreatment liquid B are jetted so as to land on the substrate in an order of the pretreatment liquid A followed by the pretreatment liquid B, and that step P is performed prior to step 1. In this case, the resin contained in the pretreatment liquid A is preferably a water-dispersible resin.

For example, polyester knitted fabrics and the like may use fibers that tend to have few hydrophilic groups, and may also have considerable openings due to the knitted mesh, and, therefore, when inkjet printing is performed thereon, the ink may tend to flow readily into the spaces within the substrate and may tend to be difficult to retain on the substrate surface. Accordingly, achieving the desired image may sometimes be an issue.

In those cases where a pretreatment liquid P containing a coagulant is applied to the substrate surface, and then the pretreatment liquid A containing a water-dispersible resin as the resin is applied on top of the pretreatment liquid P to adhere the water-dispersible resin to the surface of the substrate, the water-dispersible resin may be aggregated to form enlarged particles in a region near the surface of the substrate. As a result, by aggregating the water-dispersible resin on the substrate, thereby adhering the resin to the substrate while increasing the surface area, unevenness in the substrate surface may be moderated to create a relatively flatter surface. Further, by applying the pretreatment liquid B containing a coagulant to the substrate, not only does the colorant in the ink tend to aggregate more easily on the substrate surface, but the aggregates of the water-dispersible resin may exhibit a filling effect that may suppresses penetration of the ink colorant into the spaces within the substrate, enabling the colorant to be fixed close to the substrate surface. Accordingly, when printing is then performed on this substrate, irregularities or bleeding on the substrate surface may be reduced, and an image of superior density may be formed.

Examples of pretreatment liquids P that may be used include those pretreatment liquids P used in a method for producing printed matter according to a second embodiment described below.

Examples of the coagulant contained in the pretreatment liquid P include metal salts and organic acids and the like, but metal salts are preferred, and polyvalent metal salts are particularly preferred. The pretreatment liquid P and the pretreatment liquid B preferably each independently contain a polyvalent metal salt, and it is particularly preferable that the pretreatment liquid P and the pretreatment liquid B both contain the same polyvalent metal salt.

The pretreatment liquid P may be the same as, or different from, the pretreatment liquid B.

The pretreatment liquid P is preferably applied to the substrate using an inkjet system.

The amount applied of the pretreatment liquid P per unit of substrate surface is preferably within a range from 1 to 100 $g/m^2$, and more preferably from 5 to 50 $g/m^2$.

The method for producing printed matter preferably also includes, after step 2, a step of heating the substrate (hereafter sometimes referred to as the heating step). This may dry the ink and may cause the water-dispersible resin to undergo film formation, making it easier to form a strong ink film.

The heating temperature in the heating step for heating the substrate that is performed after step 2 is preferably at least 70° C., and more preferably 100° C. or higher. On the other hand, the heating temperature in this heating step is preferably not more than 200° C. The heating temperature in this heating step is more preferably within a range from 70 to 200° C.

The method for producing printed matter may also include, in step 1, during application of the two pretreatment liquids, and/or between step 1 and step 2 or the like, a step of drying the pretreatment liquids such as a step of heating the substrate. However, in the method for producing printed matter of the first embodiment, application of the pretreatment liquid that lands on the substrate second among the pretreatment liquid A and the pretreatment liquid B in step 1, and application of the inkjet ink, is preferably conducted using a wet-on-wet method.

By performing application of the pretreatment liquid that lands on the substrate second and application of the ink using a wet-on-wet method, the two pretreatment liquids may undergo appropriate mixing, making it easier to improve the uniformity of the image density.

The pretreatment liquid that lands on the substrate first may be forced into the interior of the substrate by the pretreatment liquid that lands on the substrate thereafter, making it easier to obtain an anchoring effect and improve the fixability.

<<Method for Producing Printed Matter According to Second Embodiment>>

A method for producing printed matter according to a second embodiment of the present invention includes pretreating the surface of a substrate sequentially with a pretreatment liquid P containing a coagulant, a pretreatment liquid A containing a water-dispersible resin, and then a pretreatment liquid B containing a coagulant, and subsequently applying an aqueous inkjet ink to the pretreated surface using an inkjet system.

For example, polyester knitted fabrics and the like may use fibers that tend to have few hydrophilic groups, and may also have considerable openings due to the knitted mesh, and, therefore, although these fabrics offer advantages such as good breathability and ready drying of perspiration, when inkjet printing is performed thereon, the ink may tend to flow readily into the openings within the fabric, and, therefore, may tend to be difficult to retain on the substrate surface. Accordingly, achieving the desired image may sometimes be an issue.

In those cases where the pretreatment liquid P containing a coagulant is applied to the substrate surface, and then the pretreatment liquid A containing a water-dispersible resin is applied on top of the pretreatment liquid P to adhere the water-dispersible resin to the surface of the substrate, the water-dispersible resin may be aggregated to form enlarged particles in a region near the surface of the substrate. As a result, by aggregating the water-dispersible resin on the substrate, thereby adhering the resin to the substrate while increasing the surface area, unevenness in the substrate surface may be moderated to create a relatively flatter surface. On the other hand, by applying the pretreatment liquid A on top of the region to which the pretreatment liquid P has been applied, the aggregation action at the substrate surface may sometimes be reduced. However, by subsequently applying the pretreatment liquid B containing a coagulant to the substrate, not only does the colorant in the ink tend to aggregate more easily on the substrate surface, but the aggregates of the water-dispersible resin may exhibit a filling effect that may suppresses penetration of the ink colorant into the spaces within the substrate, enabling the colorant to be fixed close to the substrate surface. Accordingly, when printing is then performed on this substrate, irregularities or bleeding on the substrate surface may be reduced, and an image of superior density may be formed.

<Substrate>

In the method for producing printed matter of the second embodiment, there are no particular limitations on the substrate, provided it exhibits liquid permeability. For example, substrates such as fabrics that are able to be used in the method for producing printed matter of the first embodiment may be used as the substrate. The method for producing printed matter of the second embodiment may be preferably used for producing printed matter using substrates that have multiple openings but exhibit low water absorption, such as fabrics containing polyester.

<Pretreatment Liquid P>

In the method for producing printed matter of the second embodiment, the pretreatment liquid P preferably contains at least water and a coagulant.

There are no particular limitations on the water used, and examples include tap water, ion-exchanged water, deionized water, distilled water and ultrapure water.

In the method for producing printed matter of the second embodiment, the coagulant contained in the pretreatment liquid P is preferably a substance that causes aggregation of water-dispersible resins. Examples of the coagulant contained in the pretreatment liquid P include metal salts and organic acids. The pretreatment liquid P may contain only one of these coagulants, or may contain a combination of two or more coagulants.

In the method for producing printed matter of the second embodiment, from the viewpoint of improving the image quality, the lower limit for the amount of the coagulant in the pretreatment liquid P, relative to the total mass of the pretreatment liquid P, is preferably at least 1% by mass, more preferably at least 3% by mass, even more preferably at least 5% by mass, and particularly preferably 8% by mass or greater. On the other hand, the amount of the coagulant in the pretreatment liquid P, relative to the total mass of the pretreatment liquid P, is preferably not more than 30% by mass, more preferably not more than 15% by mass, and particularly preferably 12% by mass or less. The amount of the coagulant in the pretreatment liquid P, relative to the total mass of the pretreatment liquid P, is preferably within a range from 1 to 30% by mass, more preferably from 3 to 30% by mass, even more preferably from 5 to 15% by mass, and still more preferably from 8 to 12% by mass.

The metal salt preferably has a property of causing aggregation of water-dispersible resins. From the viewpoint of the strength of the aggregation action, the metal salt is preferably a polyvalent metal salt.

The polyvalent metal salt may use, for example, one or more metal salts selected from among the polyvalent metal salts that may be used in the pretreatment liquid B of the method for producing printed matter of the first embodiment as described above. A single metal salt may be used alone in the pretreatment liquid P, or a combination of two or more metal salts may be used in the pretreatment liquid P.

In the method for producing printed matter of the second embodiment, the amount of the metal salt in the pretreatment liquid P, relative to the total mass of the pretreatment liquid P, is preferably at least 0.5% by mass, more preferably at least 1% by mass, and even more preferably at least 3% by mass, and for example, may be 5% by mass or greater. Further, the amount of the metal salt in the pretreatment liquid P, relative to the total mass of the pretreatment liquid P, is preferably not more than 30% by mass, more preferably not more than 25% by mass, even more preferably not more than 20% by mass, and still more preferably not more than 15% by mass, and for example, may be 12% by mass or less. For example, the concentration of the metal salt in the pretreatment liquid P, relative to the total mass of the pretreatment liquid P, is preferably within a range from 0.5 to 30% by mass, more preferably from 1 to 25% by mass, even more preferably from 1 to 20% by mass, still more preferably from 1 to 15% by mass, and for example, may be from 3 to 12% by mass, or from 5 to 12% by mass.

In the method for producing printed matter of the second embodiment, the organic acid preferably has a property of causing aggregation of water-dispersible resins. The organic acid may use, for example, one or more organic acids selected from among the organic acids that may be used in the pretreatment liquid B of the method for producing printed matter of the first embodiment as described above. A single organic acid may be used alone in the pretreatment liquid P, or a combination of two or more organic acids may be used in the pretreatment liquid P.

In the method for producing printed matter of the second embodiment, from the viewpoint of improving the image quality, the amount of the organic acid in the pretreatment liquid P, relative to the total mass of the pretreatment liquid P, is preferably at least 1% by mass, more preferably at least 3% by mass, even more preferably at least 5% by mass, and still more preferably 8% by mass or greater. On the other hand, the amount of the organic acid in the pretreatment liquid P, relative to the total mass of the pretreatment liquid P, is preferably not more than 30% by mass, more preferably not more than 15% by mass, and even more preferably 12% by mass or less. From the viewpoint of achieving superior image quality even on fabrics having low hydrophilicity, the amount of the organic acid in the pretreatment liquid P, relative to the total mass of the pretreatment liquid P, is preferably within a range from 1 to 30% by mass, more preferably from 3 to 30% by mass, even more preferably from 5 to 15% by mass, and particularly preferably from 8 to 12% by mass.

In the method for producing printed matter of the second embodiment, the pretreatment liquid P may also contain, besides the components described above, one or more other components. Examples of other components include water-soluble organic solvents, pH adjusters, surfactants, dispersants, fixing agents, and preservatives.

In the pretreatment liquid P of the method for producing printed matter of the second embodiment, compounds that are liquid at room temperature and soluble in water may be used as the organic water-soluble solvent, and the use of a water-soluble organic solvent that may mix uniformly with an equal volume of water at one atmosphere and 20° C. is preferred. As the water-soluble solvent, for example, one or more water-soluble organic solvents selected from among the water-soluble organic solvents that may be used in the pretreatment liquid A of the method for producing printed matter of the first embodiment as described above may be used. The boiling point of the water-soluble organic solvent is preferably at least 100° C., and more preferably 150° C. or higher.

In the pretreatment liquid P of the method for producing printed matter of the second embodiment, a single water-soluble organic solvent may be used alone, or a combination of two or more water-soluble organic solvents may be used. The amount of the water-soluble organic solvent in the pretreatment liquid P, relative to the total mass of the pretreatment liquid P, is preferably within a range from 5 to 90% by mass, and more preferably from 10 to 50% by mass.

In the method for producing printed matter of the second embodiment, the pretreatment liquid P may be obtained, for example, by dispersing or dissolving the coagulant and any other components that are required in water.

<Pretreatment Liquid A>

In the method for producing printed matter of the second embodiment, the pretreatment liquid A preferably contains a water-dispersible resin as the resin. In the method for producing printed matter of the second embodiment, the pretreatment liquid A preferably contains at least water and a water-dispersible resin. For example, any type of water selected from among those described above in relation to the pretreatment liquid P may be used as the water.

In the pretreatment liquid A of the method for producing printed matter of the second embodiment, the water-dispersible resin is preferably a resin that can be fixed to fabrics. For example, the water-dispersible resin may use one or more resins selected from among the water-dispersible resins described above for use in the pretreatment liquid A of the method for producing printed matter of the first embodiment.

In the pretreatment liquid A of the method for producing printed matter of the second embodiment, the particle size of the water-dispersible resin may be selected appropriately in accordance with the size of the openings in the substrate, but in those cases where the pretreatment liquid A is jetted using an inkjet system, the particle size is preferably within a range from 0.01 to 0.50 μm, and more preferably from 0.05 to 0.30 μm. The particle size of the water-dispersible resin means the volume-based cumulative 50% mean diameter (d50) measured by the light scattering method (Nanotrac particle size distribution analyzer manufactured by Nikkiso Co., Ltd.).

The total amount (solid fraction) of water-dispersible resin in the pretreatment liquid A is preferably within a range from 0.5 to 30% by mass, and more preferably from 1 to 15% by mass.

In the pretreatment liquid A of the method for producing printed matter of the second embodiment, one or more selected from among olefin resins, urethane resin and (meth) acrylic-based resins are preferred as the water-dispersible resin, in terms of the ink fixability, one or more selected from among olefin resins and urethane resins are more preferred, and in terms of the dry rubbing fastness of the printed matter, one or more selected from among urethane resins are even more preferred. In those cases where the pretreatment liquid A is jetted using an inkjet system, from the viewpoint of material applicability relative to the inkjet head, an anionic urethane resin having one or more anionic functional groups is preferred. Examples the anionic functional group include a carboxyl group, a sulfo group and a hydroxyl group. Specific examples of commercially available anionic water-dispersible urethane resins include SUPERFLEX 740 and SUPERFLEX 470 manufactured by DKS Co. Ltd.

In the method for producing printed matter of the second embodiment, the pretreatment liquid A may also contain, besides the components described above, one or more other components. Examples of other components includes water-soluble organic solvents, pH adjusters, surfactants, dispersants, fixing agents, and preservatives. For example, the water-soluble organic solvent may be one or more water-soluble organic solvents selected from among the water-soluble organic solvents that may be used in the pretreatment liquid P as described above. Further, the water-soluble organic solvent may be used, for example, in an amount as described for the water-soluble organic solvent in relation to the pretreatment liquid P.

The pretreatment liquid A of the method for producing printed matter of the second embodiment may be produced, for example, using a method described for the pretreatment liquid A of the method for producing printed matter of the first embodiment.

As the pretreatment liquid A of the method for producing printed matter of the second embodiment, for example, the pretreatment liquid A of the method for producing printed matter of the first embodiment may be used in which a water-dispersible resin is used as the resin.

<Pretreatment Liquid B>

In the method for producing printed matter of the second embodiment, the pretreatment liquid B preferably contains at least water and a coagulant. For example, any type selected from among those described above in relation to the pretreatment liquid P may be used as the water.

The coagulant used in the pretreatment liquid B of the method for producing printed matter of the second embodiment preferably has a property of causing aggregation of inks. Preferred examples of the coagulant include cationic resins, metal salts and organic acids. From the viewpoint of the strength of the aggregation action, a polyvalent metal salt is preferred. One of these coagulants may be used alone, or a combination of two or more coagulants may be used.

In the pretreatment liquid B of the method for producing printed matter of the second embodiment, cationic resins used as the coagulant preferably have ink aggregation properties. The cationic resin may use, for example, one or more cationic resins selected from among the cationic resins that may be used in the pretreatment liquid B of the method for producing printed matter of the first embodiment as described above.

In the method for producing printed matter of the second embodiment, from the viewpoint of improving the image quality, the amount of the cationic resin in the pretreatment liquid B, relative to the total mass of the pretreatment liquid B, is preferably at least 1% by mass, more preferably at least 3% by mass, and even more preferably 5% by mass or greater. On the other hand, the amount of the cationic resin in the pretreatment liquid B, relative to the total mass of the pretreatment liquid B, is preferably not more than 30% by mass, more preferably not more than 15% by mass, and even more preferably 12% by mass or less. For example, from the viewpoint of improving the image quality, the amount of the cationic resin in the pretreatment liquid B, relative to the total mass of the pretreatment liquid B, is preferably within a range from 1 to 30% by mass, more preferably from 3 to 15% by mass, and particularly preferably from 5 to 12% by mass.

In the method for producing printed matter of the second embodiment, as the metal salt used as a coagulant in the pretreatment liquid B, for example, one or more metal salts selected from among the metal salts that may be used in the pretreatment liquid P as described above may be used.

Similarly, as the organic acid used as a coagulant in the pretreatment liquid B, for example, one or more organic acids selected from among organic acids that may be used in the pretreatment liquid P as described above may be used. The metal salt may be used, for example, in an amount as described for the metal salt in relation to the pretreatment P. Similarly, the organic acid may be used, for example, in an amount as described for the organic acid in relation to the pretreatment liquid P.

In the method for producing printed matter of the second embodiment, the total amount of coagulant in the pretreatment liquid B may be an amount as described above for the coagulant in the pretreatment liquid P. The coagulant contained in the pretreatment liquid P and the coagulant contained in the pretreatment liquid B may be the same, and for example, may be the same polyvalent metal salt. For example, the pretreatment liquid P and the pretreatment liquid B may each independently contain a polyvalent metal salt, and the pretreatment liquid P and the pretreatment liquid B may contain the same polyvalent metal salt. The pretreatment liquid P and the pretreatment liquid B may be the same or different.

In the method for producing printed matter of the second embodiment, the pretreatment liquid B may also contain, besides the components described above, one or more other components. Examples of other components include water-soluble organic solvents, pH adjusters, surfactants, dispersants, fixing agents, and preservatives. The water-soluble organic solvent may be one or more water-soluble organic solvents selected from among the water-soluble organic solvents that may be used in the pretreatment liquid P as described above. The water-soluble organic solvent may be used, for example, in an amount as described for the water-soluble organic solvent in relation to the pretreatment liquid P.

The pretreatment liquid B of the method for producing printed matter of the second embodiment may be produced, for example, using a method as described for the pretreatment liquid P.

In the method for producing printed matter of the second embodiment, the pretreatment liquid B of the method for producing printed matter of the first embodiment may be used as the pretreatment liquid B.

<Aqueous Inkjet Inks>

The aqueous inkjet inks described above for use in the method for producing printed matter of the first embodiment may be used as the aqueous inkjet inks.

<Method for Producing Printed Matter>

The method for producing printed matter of the second embodiment may include:

(1) pretreating the surface of the substrate with the pretreatment liquid P (hereafter sometimes referred to as the "first step"), (2) further pretreating the surface of the substrate that has been pretreated with the pretreatment liquid P with the pretreatment liquid A (hereafter sometimes referred to as the "second step"), (3) further pretreating the surface of the substrate that has been pretreated with the pretreatment liquid P and the pretreatment liquid A with the pretreatment liquid B (hereafter sometimes referred to as the "third step"), and (4) performing printing by using an inkjet system to jet an aqueous ink onto the surface of the substrate that has been pretreated with the pretreatment liquid P, the pretreatment liquid A and the pretreatment liquid B (hereafter sometimes referred to as the "fourth step").

As mentioned above, the pretreatment liquid P and the pretreatment liquid B may be the same.

The first step, the second step, the third step and the fourth step are performed in this order. Another step such as a pretreatment liquid drying step may be interposed between the first step and the second step, the second step and the third step, or the third step and the fourth step, or the steps may be performed consecutively without any interposing steps.

Pretreatment of the surface of the substrate with the pretreatment liquids may be performed by applying each of the pretreatment liquid to the substrate surface using a coating or printing method or the like. Specifically, application of the pretreatment liquids may be performed using a coating device such as a brush, roller, bar coater, blade coater, die coater, roll coater, or air knife coater, or may be achieved by conducting printing using a printing method such as an inkjet printing, gravure printing or flexographic printing.

The inkjet printing using an aqueous ink in the fourth step may be performed using a typical inkjet printer.

The method for producing printed matter of the second embodiment may be a method in which, for example, an inkjet printer is used to jet the pretreatment liquid P onto the surface of the substrate using an inkjet system, the second pretreatment liquid A is jetted over the top of the pretreatment liquid P using an inkjet system, the pretreatment liquid B is then jetted on top of the pretreatment liquid A using an inkjet system, and the aqueous ink is then jetted on top of the pretreatment liquid B using an inkjet system.

From the viewpoints of the aggregation and increase in particle size of the water-dispersible resin of the pretreatment liquid A, and the resulting moderation and flattening of unevenness of the fibers at the substrate surface, the coating amount of the pretreatment liquid P per unit of substrate surface area is preferably within a range from 1 to 100 g/m$^2$, and more preferably from 5 to 50 g/m$^2$. From the viewpoints of the aggregation and increase in particle size of the water-dispersible resin of the pretreatment liquid A, and the resulting moderation and flattening of unevenness of the fibers at the substrate surface, the coating amount of the pretreatment liquid A per unit of substrate surface area is preferably within a range from 1 to 100 g/m$^2$, and more preferably from 5 to 50 g/m$^2$. From the viewpoints of achieving fixation of the colorant in the ink near the surface of the substrate, and obtaining favorable printed images having a combination of superior color development and rubbing fastness, the coating amount of the pretreatment liquid B per unit of substrate surface area is preferably within a range from 1 to 100 g/m$^2$, and more preferably from 5 to 50 g/m$^2$.

EXAMPLES

The present invention is described below in further detail based on a series of examples, but the present invention is not limited to only these examples. Unless specifically stated otherwise, "%" represents "% by mass". The blend amounts shown for the various components in the tables also indicate "% by mass" values. If no specific description is provided, then for those components that include a solvent or the like within the component, the blend amount shown in the table represents the total amount of the component including the solvent or the like.

<<Method for Producing Printed Matter of the First Embodiment>>

<Preparation of Pretreatment Liquids and Inks>

The raw materials shown in Tables 1 to 3 were mixed together and stirred at 100 rpm for 30 minutes using a Mix Rotor. Following stirring, each mixture was filtered through a 5 μm nylon syringe filter, thus preparing an ink 1, pretreatment liquids A1 to A4, and pretreatment liquids B1 to B3. The blend amount of each raw material in the table indicates % by mass. In the case of components that contain a volatile component, the blend amount of each component in the table includes the mass of the volatile component.

The raw materials shown in Tables 1 to 3 are as follows.

SUPERFLEX 500M (product name): an emulsion of a nonionic water-dispersible urethane resin, manufactured by DKS Co. Ltd.

Mowinyl 7720 (product name): an emulsion of a nonionic water-dispersible acrylic resin, manufactured by Japan Coating Resin Corporation SUNPLEX PUE-C200B (product name): an emulsion of a cationic water-dispersible urethane resin, manufactured by Murayama Chemical Laboratory Co., Ltd.

SUPERFLEX 740 (product name): an emulsion of an anionic water-dispersible urethane resin, manufactured by DKS Co. Ltd.

OLFINE E1010 (product name): an acetylene glycol-based surfactant, manufactured by Nissin Chemical Industry Co., Ltd.

SILFACE SAG002 (product name): a silicon-based surfactant, manufactured by Nissin Chemical Industry Co., Ltd.

Lactic acid: manufactured by FUJIFILM Wako Pure Chemical Corporation

Calcium chloride: manufactured by FUJIFILM Wako Pure Chemical Corporation

SHALLOL DC-303P (product name): a cationic water-soluble resin, active ingredient content: 41% (polydiallyldimethylammonium chloride), manufactured by DKS Co., Ltd.

Diethylene glycol: manufactured by FUJIFILM Wako Pure Chemical Corporation

Dipropylene glycol: manufactured by FUJIFILM Wako Pure Chemical Corporation 1,2-butanediol: manufactured by Tokyo Chemical Industry Co., Ltd.

CAB-O-JET 300 (product name): a carbon black pigment dispersion, manufactured by Cabot Corporation TAKENATE WB3936 (product name): an isocyanate-based crosslinking agent, manufactured by Mitsui Chemicals, Inc.

Glycerol: manufactured by FUJIFILM Wako Pure Chemical Corporation

Ethylene glycol: manufactured by FUJIFILM Wako Pure Chemical Corporation

The two types of pretreatment liquids were mixed together, and the aggregation was evaluated. Specifically, using the combinations shown in Table 1, 10 g samples of each of the pretreatment liquids A-1 to A-4 were mixed with 10 g samples of each of the pretreatment liquids B-1 to B-3, and whether or not aggregation occurred was inspected visually. The results are shown in Table 1.

TABLE 1

| (units: % by mass) | Active ingredient | Pretreatment liquid A-1 | Pretreatment liquid A-2 | Pretreatment liquid A-3 | Pretreatment liquid A-4 |
|---|---|---|---|---|---|
| SUPERFLEX 500M | 45% | 22.2 | | | |
| Mowinyl 7720 | 45% | | 22.2 | | |
| SUNPLEX PUE-C200B | 40% | | | 25.0 | |
| SUPERFLEX 740 | 40% | | | | 25.0 |
| Diethylene glycol | | 5.0 | | 5.0 | 5.0 |
| Dipropylene glycol | | | 5.0 | | 5.0 |
| Glycerol | | 5.0 | 5.0 | 5.0 | |
| OLFINE E1010 | | 1.0 | | | 0.5 |
| SILFACE SAG002 | | | 1.0 | 1.0 | 0.5 |
| Ion-exchanged water | | 66.8 | 66.8 | 64.0 | 64.0 |
| Total (units: % by mass) | | 100.0 | 100.0 | 100.0 | 100.0 |
| Aggregation evaluation: pretreatment liquid B-1 | | No aggregation | No aggregation | No aggregation | Aggregation |
| Aggregation evaluation: pretreatment liquid B-2 | | No aggregation | No aggregation | No aggregation | Aggregation |
| Aggregation evaluation: pretreatment liquid B-3 | | No aggregation | No aggregation | No aggregation | Aggregation |

TABLE 2

| (units: % by mass) | Active ingredient | Pretreatment liquid B-1 | Pretreatment liquid B-2 | Pretreatment liquid B-3 |
|---|---|---|---|---|
| Lactic acid | 90% | 11.1 | | |
| Calcium chloride | | | 10.0 | |
| SHALLOL DC-303P | 41% | | | 17.1 |
| Diethylene glycol | | 10.0 | | |
| Dipropylene glycol | | | 10.0 | 5.0 |
| 1,2-butanediol | | | | 5.0 |
| OLFINE E1010 | | 1.0 | 1.0 | |
| SILFACE SAG002 | | | | 1.0 |
| Ion-exchanged water | | 77.9 | 79.0 | 71.9 |
| Total (units: % by mass) | | 100.0 | 100.0 | 100.0 |

TABLE 3

| (units: % by mass) | Active ingredient | Ink 1 |
|---|---|---|
| CAB-O-JET 300 | 15% | 20.0 |
| SUPERFLEX 740 | 40% | 16.9 |
| TAKENATE WB3936 | 36% | 3.3 |
| Glycerol | | 20.0 |
| Ethylene glycol | | 5.0 |

TABLE 3-continued

| (units: % by mass) | Active ingredient | Ink 1 |
| --- | --- | --- |
| OLFINE E1010 | | 0.5 |
| Ion-exchanged water | | 34.3 |
| Total (units: % by mass) | | 100.0 |

<Production of Printed Matter>

Using a 100% polyester fabric as a substrate, the pretreatment liquids shown in Tables 4 to 6 and the ink 1 were used to perform printing in accordance with the following procedure, thus obtaining printed matter having a 200 mm×200 mm single-color solid image printed thereon.

In Examples 1 to 14, a serial-type inkjet printer using a recording head with a resolution of 300 dpi was used as the printer. The arrangement within the serial recording head unit was as illustrated in FIG. 2. In FIG. 2, a second pretreatment liquid was supplied to the first recording head 11, a first pretreatment liquid was supplied to the second recording head 12, and the ink 1 was supplied to the black recording head 13K of the third recording head.

In Examples 1 to 11, using the combinations shown in Tables 4 and 5, a first pretreatment liquid and a second pretreatment liquid were jetted so as to land on the substrate in this order, and following application of the pretreatment liquids, the ink 1 was applied to the substrate to complete production of the printed matter.

Specifically, using the 300 dpi recording heads, the first pretreatment liquid, the second pretreatment liquid and the ink 1 were each jetted onto the substrate by bidirectional printing at 1200 dpi×1200 dpi to print a single-color solid image of 200 mm×200 mm. A movement of one line in the transport direction Y of the substrate was set to correspond with a resolution of 1200 dpi (one quarter of the distance between nozzles) in the transport direction Y. Further, for the first pretreatment liquid, the landing time difference $\Delta T_Y$ on the substrate between adjacent lines in the substrate transport direction Y was at least 10 ms.

Further, in each of the first recording head 11, the second recording head 12, and the third recording head 13, a plurality of nozzles were formed along the substrate transport direction Y. The second recording head 12 jetted the first pretreatment liquid from consecutive nozzles at the upstream side in the transport direction Y, and moving of the recording head unit back and forth across the main scanning direction X and transporting of the substrate were repeated. In this way, the first pretreatment liquid was jetted onto the substrate so as to form four lines within the distance separating adjacent nozzles in the transport direction Y.

During this process, if the nozzles are labeled nozzle a, nozzle b, and nozzle c from the upstream side in the transport direction Y, then the first lines of the first pretreatment liquid were formed from the nozzles, during the outward path along the main scanning direction X. Subsequently, the substrate was transported, and a second line was formed by jetting the first pretreatment liquid from the nozzle b on the return path across the main scanning direction X, with this second line of the first pretreatment liquid from nozzle b being formed adjacently on the upstream side in the transport direction Y of the first line of the first pretreatment liquid that had been jetted from the nozzle a. During formation of this second line, the first pretreatment liquid was also jetted with the same spacing from the nozzle a and nozzle c to form second lines. By repeating this operation, the four lines of the first pretreatment liquid were formed at positions corresponding to a resolution of 1200 dpi in the substrate transport direction Y. Here, the operation is described with respect to a small number of nozzles. However, this operation was performed across all nozzles of the first recording head 11.

The substrate was transported consecutively in the transport direction Y, and when the region having the four lines of the first treatment liquid formed thereon reached a position facing the nozzles of the first recording head 11 on the downstream side in the transport direction Y of the above nozzles of the second recording head 12, the second pretreatment liquid was jetted from the first recording head 11 so as to overlap the four lines of the previously jetted first treatment liquid, while the recording head unit was moved back and forth across the main scanning direction and the substrate was moved. Accordingly, four lines in which the first treatment liquid and the second pretreatment liquid were layered in this order were formed. The jetting method for the second pretreatment liquid is the same as that described above for the first pretreatment liquid.

The substrate was then transported further in the transport direction Y, and when the region having the four lines composed of the layered first treatment liquid and second pretreatment liquid formed thereon reached a position facing the third recording head 13 that is positioned downstream in the transport direction Y, the aqueous ink was jetted from the third recording head 13 while the recording head unit was moved across the main scanning direction, thereby layering the first pretreatment liquid, the second pretreatment liquid and the aqueous ink in this order and forming an image.

In Example 12, the pretreatment liquid B-2 was applied as the first pretreatment liquid, a second pretreatment liquid was not applied, and the aqueous ink 1 was then applied.

In Example 13, the pretreatment liquid A-3 was applied as the first pretreatment liquid, a second pretreatment liquid was not applied, and the aqueous ink 1 was then applied.

In Example 14, the two pretreatment liquids shown in Table 6 were jetted using the method illustrated in FIG. 4, so that the pretreatment liquid A-2, the pretreatment liquid B-2 and the ink 1 were jetted so as to land on the substrate in this order on the outward path, but then on the return path, the pretreatment liquid B-2, the pretreatment liquid A-2 and the ink 1 were jetted so as to land on the substrate in this order, thereby producing printed matter.

In the case of the printed matter of Example 15, a line head-type inkjet printer having the same recording heads as those used in the production of the printed matter of Examples 1 to 14 disposed in a staggered arrangement and installed at 1200 dpi in the main scanning direction was used, the pretreatment liquids shown in Table 6 were jetted onto a substrate (a 100% polyester fabric) in the order shown in Table 6, and the ink 1 was then jetted onto the substrate to complete printing of a 200 mm×200 mm single-color solid image. The pretreatment liquids and the ink were jetted under conditions including a jetting frequency of 15 k, a transport speed of 38 m/min, and a sub-scanning direction resolution of 1200 dpi.

In each of Examples 1 to 15, following completion of the inkjet printing of the ink 1 on the substrate, the substrate was heat-pressed at 180° C. for one minute.

In Table 4, the row labeled "ΔT" indicates whether or not the pretreatment liquid that lands on the substrate first (the first pretreatment liquid) exhibits a value for at least one of the landing time difference $\Delta T_X$ between the two dots which are arranged along the main scanning direction and for which the distance between the dots reaches a shortest value among any two dots of the first pretreatment liquid arranged along the main scanning direction, and the landing time difference $\Delta T_Y$ between the two dots which are arranged along a direction that intersects the main scanning direction and for which the distance between the dots reaches a shortest value among any two dots of the first pretreatment liquid arranged along a direction that intersects the main scanning direction, that is at least 10 ms. A table entry of "at least 10 ms" indicates that at least one (ΔT) of $\Delta T_X$ and $\Delta T_Y$ for the pretreatment liquid that lands on the substrate first is at least 10 ms, whereas "less than 10 ms" indicates that both $\Delta T_X$ and $\Delta T_Y$ for the pretreatment liquid that lands on the substrate first are less than 10 ms.

In Example 12 and Example 13, because only a single pretreatment liquid was used, the ΔT results is shown for the pretreatment liquid that was used. In Example 14, although the landing order was not fixed, both of the pretreatment liquids exhibited a ΔT value of at least 10 ms.

<Evaluation of Fixability>

The printed matter was rubbed using a type-II rubbing tester in accordance with the method prescribed in JIS L0849, and soiling of the rubbing fabric was evaluated using a soiling grayscale. The evaluation criteria are shown below. The results are shown in Tables 4 to 6.

AA: dry rubbing soiling of grade 3 or higher
A: dry rubbing soiling of grade 2-3
B: dry rubbing soiling of grade 2
C: dry rubbing soiling of less than grade 2

<Evaluation of Image Density Uniformity>

Evaluation of the image density uniformity was performed as follows. The printed matter obtained from each of the above examples was inspected from a distance of 50 cm and evaluated against the following evaluation criteria. The results are shown in Tables 4 to 6.

A: image density irregularities are not really noticeable
B: image density irregularities are more noticeable than A
C: clear image density irregularities are noticeable

TABLE 4

|  | Example 1 | Example 2 | Example 3 | Example 4 | Example 5 | Example 6 |
|---|---|---|---|---|---|---|
| First pretreatment liquid | Pretreatment liquid A-1 Nonionic water-dispersible urethane resin | Pretreatment liquid A-2 Nonionic water-dispersible acrylic resin | Pretreatment liquid A-1 Nonionic water-dispersible urethane resin | Pretreatment liquid A-1 Nonionic water-dispersible urethane resin | Pretreatment liquid A-2 Nonionic water-dispersible acrylic resin | Pretreatment liquid A-3 Cationic water-dispersible urethane resin |
| Second pretreatment liquid | Pretreatment liquid B-1 Lactic acid | Pretreatment liquid B-2 Lactic acid | Pretreatment liquid B-2 Metal salt | Pretreatment liquid B-3 Cationic resin | Pretreatment liquid B-2 Metal salt | Pretreatment liquid B-1 Lactic acid |
| ΔT | at least 10 ms | at least 10 ms | at least 10 ms | at least 10 ms | at least 10 ms | at least 10 ms |
| Fixability | AA | A | A | A | B | B |
| Image density uniformity | A | A | A | A | A | A |

TABLE 5

|  | Example 7 | Example 8 | Example 9 | Example 10 | Example 11 |
|---|---|---|---|---|---|
| First pretreatment liquid | Pretreatment liquid A-4 Anionic water-dispersible urethane resin | Pretreatment liquid B-1 Lactic acid | Pretreatment liquid B-2 Metal salt | Pretreatment liquid B-2 Metal salt | Pretreatment liquid B-1 Lactic acid |
| Second pretreatment liquid | Pretreatment liquid B-1 Lactic acid | Pretreatment liquid A-1 Nonionic water-dispersible urethane resin | Pretreatment liquid A-1 Nonionic water-dispersible urethane resin | Pretreatment liquid A-3 Cationic water-dispersible urethane resin | Pretreatment liquid A-4 Anionic water-dispersible urethane resin |
| ΔT | at least 10 ms | at least 10 ms | at least 10 ms | at least 10 ms | at least 10 ms |
| Fixability | A | AA | AA | B | B |
| Image density uniformity | B | B | B | B | B |

TABLE 6

|  | Example 12 | Example 13 | Example 14 | Example 15 |
|---|---|---|---|---|
| First pretreatment liquid | Pretreatment liquid B-2 Metal salt | Pretreatment liquid A-3 Cationic water-dispersible urethane resin | random Pretreatment liquid A-2 Pretreatment liquid B-2 | Pretreatment liquid B-1 Lactic acid |
| Second pretreatment liquid | — | — |  | Pretreatment liquid A-4 Anionic water-dispersible urethane resin |

TABLE 6-continued

|  | Example 12 | Example 13 | Example 14 | Example 15 |
|---|---|---|---|---|
| ΔT | at least 10 ms | at least 10 ms | at least 10 ms | less than 10 ms |
| Fixability | C | C | C | C |
| Image density uniformity | B | C | C | C |

The printed matter of Examples 1 to 11 exhibited improved fixability compared with the printed matter of Examples 12 and 13 in which only one of the pretreatment liquid A containing a resin or the pretreatment liquid B containing a coagulant was used, the printed matter of Example 14 in which the pretreatment liquid A and the pretreatment liquid B were not jetted so as to land on the substrate in a fixed order, and the printed matter of Example 15 in which, for the pretreatment liquid that was jetted onto the substrate first, both the landing time difference $\Delta T_X$ between the two dots which are arranged along the main scanning direction and for which the distance between the dots reached a shortest value among any two dots arranged along the main scanning direction, and the landing time difference $\Delta T_Y$ between the two dots which are arranged along a direction that intersects the main scanning direction and for which the distance between the dots reached a shortest value among any two dots arranged along a direction that intersects the main scanning direction were less than 10 ms.

<<Method for Producing Printed Matter of Second Embodiment>>

<Production of Pretreatment Liquids>

Raw materials were mixed together in the blend ratios shown in Table 7, and each mixture was then filtered through a cellulose acetate filter with a pore size of 0.8 μm to obtain a pretreatment liquid.

Calcium chloride and lactic acid cause aggregation not only of CAB-O-JET 300, but also of SUPERFLEX 740, SUPERFLEX 470 and VINYBLAN 2585. Accordingly, the pretreatment liquid 2-1 and the pretreatment liquid 2-2 can be used as either the pretreatment liquid P or the pretreatment liquid B. Further, the pretreatment liquid 2-3, the pretreatment liquid 2-4 and the pretreatment liquid 2-5 can be used as the pretreatment liquid A.

Details of the raw materials shown in Table 7 are as follows.

Calcium chloride: manufactured by FUJIFILM Wako Pure Chemical Corporation

Lactic acid: manufactured by FUJIFILM Wako Pure Chemical Corporation

SUPERFLEX 740 (product name): a urethane water-dispersible resin, manufactured by DKS Co. Ltd. (average particle size: 0.20 μm)

SUPERFLEX 470 (product name): a urethane water-dispersible resin, manufactured by DKS Co. Ltd. (average particle size: 0.05 μm)

VINYBLAN 2585 (product name): an acrylic water-dispersible resin, manufactured by Nissin Chemical Co., Ltd. (average particle size: 0.23 μm)

Surfynol 485 (product name): an acetylene glycol surfactant, manufactured by Nissin Chemical Co., Ltd.

Glycerol: manufactured by Kanto Chemical Co., Inc.

<Production of Ink>

Raw materials were mixed together in the blend ratio shown in Table 8, and the resulting mixture was then filtered through a cellulose acetate filter with a pore size of 0.8 μm to obtain an ink.

TABLE 8

| Raw material | Compound or product name | Solid fraction | Pigment component | Ink 2 |
|---|---|---|---|---|
| Pigment dispersion | CAB-O-JET 300 |  | 15.0% | 20.0 |
| Water-dispersible resin | SUPERFLEX 740 | 40.0% |  | 13.5 |
|  | ARROWBASE TC4010 | 25.0% |  | 9.0 |
| Surfactant | Surfynol 485 | 100.0% |  | 0.5 |
| Water-soluble organic solvent | Glycerol | 100.0% |  | 40.0 |

TABLE 7

| Raw material | Compound or product name | Active ingredient | Pretreatment liquid 2-1 | Pretreatment liquid 2-2 | Pretreatment liquid 2-3 | Pretreatment liquid 2-4 | Pretreatment liquid 2-5 |
|---|---|---|---|---|---|---|---|
| Coagulant | Calcium chloride | 100% |  | 10.0 |  |  |  |
|  | Lactic acid | 90% | 11.1 |  |  |  |  |
| Water-dispersible resin | SUPERFLEX 740 | 40% |  |  | 25.0 |  |  |
|  | SUPERFLEX 470 | 38% |  |  |  | 25.0 |  |
|  | VINYBLAN 2585 | 45% |  |  |  |  | 22.2 |
| Surfactant | Surfynol 485 | 100% | 1.0 | 1.0 | 1.0 | 1.0 | 1.0 |
| Water-soluble organic solvent | Glycerol | 100% | 30.0 | 30.0 | 20.0 | 20.0 | 20.0 |
| Water |  | 100% | 57.9 | 59.0 | 54.0 | 54.0 | 56.8 |
| Total (% by mass) |  |  | 100.0 | 100.0 | 100.0 | 100.0 | 100.0 |

TABLE 8-continued

| Raw material | Compound or product name | Solid fraction | Pigment component | Ink 2 |
|---|---|---|---|---|
| Water | Ion-exchanged water | | | 17.0 |
| | Total (% by mass) | | | 100.0 |

Details of the raw materials shown in Table 8 are as follows.

CAB-O-JET 300 (product name): a carbon black self-dispersing pigment dispersion, manufactured by Cabot Corporation SUPERFLEX 740 (product name): a urethane water-dispersible resin, manufactured by DKS Co. Ltd. (average particle size: 0.20 μm)

ARROWBASE TC4010 (product name): an olefin water-dispersible resin, manufactured by Unitika Ltd.

Surfynol 485 (product name): an acetylene glycol surfactant, manufactured by Nissin Chemical Co., Ltd.

Glycerol: manufactured by Kanto Chemical Co., Inc.

<Production of Printed Matter>

Examples 16 to 19

A polyester knitted fabric (grammage: 270 g/m²) was cut to a size of 80 mm×210 mm to prepare a test piece. Further, the pretreatment liquid P, the pretreatment liquid A and the pretreatment liquid B were prepared as shown in Table 9.

Figure 5A:
FIG. 5A is a kanji character used in the evaluation of "bleeding" in the examples.

The pretreatment liquid P was coated onto the test piece in a coating amount of 40 g/m², the pretreatment liquid A was then coated onto the pretreatment liquid P in a coating amount of 40 g/m² without providing a drying step, the pretreatment liquid B was then coated onto the pretreatment liquid A in a coating amount of 40 g/m² without providing a drying step, and an inkjet printer MMP-813BT-C manufactured by Mastermind Inc. was then used to print an image on top in a coating amount of 20 g/m² without providing a drying step. The printed image included a single-color solid image and a kanji character of point size 12 in the Mincho font illustrated in FIG. 5A. Following printing of the image, a Fusion heat press was used to perform heating at 180° C. for 60 seconds to obtain the printed matter.

<Evaluations>

The printed matter of Examples 16 to 19 obtained in the manner described above was subjected to evaluations (1) to (3) described below. The results are shown in Table 9.

(1) Image Density Uniformity

Density irregularities in the printed black solid image were inspected visually and evaluated against the following criteria.

Figure 5B:
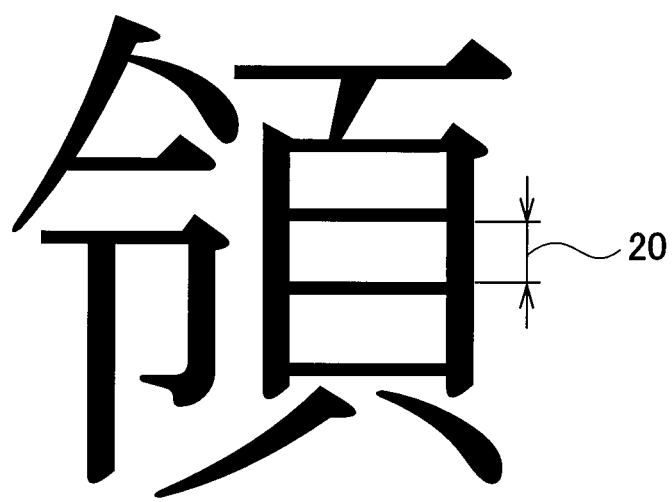
FIG. 5B is a kanji character used in the evaluation of "bleeding" in the examples.

A: image density irregularities were not noticeable
C: image density irregularities were noticeable (2) Bleeding In the printed 12-point kanji character, the dimension of a gap 20 between two horizontal lines indicated using arrows in FIG. 5B was inspected and evaluated against the following criteria.

A: the dimension of the gap 20 was at least 0.2 mm.
C: the dimension of the gap 20 was less than 0.2 mm, or there was no gap.

(3) OD Value

Using a spectral colorimeter X-Rite eXact (product name, manufactured by Videojet X-Rite K.K.), the OD value was measured and evaluated against the following criteria.

A: OD value of 1.30 or greater
B: OD value of at least 1.20 but less than 1.30
C: OD value of less than 1.20

TABLE 9

| | Example 16 | Example 17 | Example 18 | Example 19 |
|---|---|---|---|---|
| Pretreatment liquid P | Pretreatment liquid 2-2 | Pretreatment liquid 2-2 | Pretreatment liquid 2-2 | Pretreatment liquid 2-2 |
| Pretreatment liquid A | Pretreatment liquid 2-3 | Pretreatment liquid 2-3 | Pretreatment liquid 2-4 | Pretreatment liquid 2-5 |
| Pretreatment liquid B | Pretreatment liquid 2-2 | Pretreatment liquid 2-1 | Pretreatment liquid 2-2 | Pretreatment liquid 2-2 |
| Image density uniformity | A | A | A | A |
| Bleeding | A | A | A | A |
| OD | A | B | A | A |

Based on the results in Table 9, it was evident that the evaluations for the image density uniformity and the bleeding in Examples 16 to 19 were favorable in each case, and the OD value was also high.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for producing printed matter, the method comprising:
    applying a pretreatment liquid A comprising a resin and a pretreatment liquid B comprising a coagulant to a substrate, each using an inkjet system; and
    after the applying of the pretreatment liquid A and the pretreatment liquid B, applying an aqueous inkjet ink to the substrate using an inkjet system,
    wherein the resin in the pretreatment liquid A comprises a water-dispersible resin comprising a water-dispersible urethane resin,
    the pretreatment liquid A and the pretreatment liquid B are jetted so as to land on the substrate in a fixed order, and
    for a first pretreatment liquid that lands on the substrate first between the pretreatment liquid A and the pretreatment liquid B, at least one time difference selected from the group consisting of a landing time difference $\Delta T_X$ between two dots that are arranged along a main scanning direction and for which a distance between the dots reaches a shortest value among any two dots arranged along the main scanning direction, and a landing time difference $\Delta T_Y$ between two dots that are arranged along a direction that intersects the main scanning direction and for which a distance between the dots reaches a shortest value among any two dots arranged along a direction that intersects the main scanning direction, is at least 10 ms.

2. The method for producing printed matter according to claim 1, wherein the water-dispersible resin comprises at least one resin selected from the group consisting of a cationic water-dispersible resin and a nonionic water-dispersible resin.

3. The method for producing printed matter according to claim 2, wherein the water-dispersible resin comprises the nonionic water-dispersible resin.

4. The method for producing printed matter according to claim 1, wherein the coagulant of the pretreatment liquid B comprises an organic acid.

5. The method for producing printed matter according to claim 1, wherein the pretreatment liquid A and the pretreatment liquid B are jetted so as to land on the substrate in an order of the pretreatment liquid A followed by the pretreatment liquid B.

6. The method for producing printed matter according to claim 5, further comprising, prior to the applying of the pretreatment liquid A and the pretreatment liquid B to the substrate each using an inkjet system, applying a pretreatment liquid P comprising a coagulant to the substrate.

7. The method for producing printed matter according to claim 1, wherein the inkjet system used for the applying of the pretreatment liquid A and the pretreatment liquid B is a serial-type inkjet system.

8. The method for producing printed matter according to claim 1,
wherein jetting of a second pretreatment liquid that is jetted onto the substrate later between the pretreatment liquid A and the pretreatment liquid B, and jetting of the aqueous inkjet ink are each performed using a wet-on-wet method.

9. The method for producing printed matter according to claim 6,
wherein the coagulant of the pretreatment liquid P comprises a coagulant that causes aggregation of the water-dispersible resin of the pretreatment liquid A, and
the coagulant of the pretreatment liquid B comprises a coagulant that causes aggregation of the aqueous inkjet ink.

10. The method for producing printed matter according to claim 6, wherein the coagulant of the pretreatment liquid P comprises a polyvalent metal salt.

11. The method for producing printed matter according to claim 6, wherein the coagulant of the pretreatment liquid B comprises a polyvalent metal salt.

12. The method for producing printed matter according to claim 6, wherein the coagulant of the pretreatment liquid P and the coagulant of the pretreatment liquid B comprise same polyvalent metal salt.

13. The method for producing printed matter according to claim 1,
wherein the coagulant comprises at least one material selected from the group consisting of a cationic resin, a polyvalent metal salt, an organic acid, and a solvent having an SP value of not more than 10 $(cal/cm^3)^{1/2}$, and
the organic acid comprises at least one acid selected from the group consisting of formic acid, acetic acid, oxalic acid, citric acid, malic acid, ascorbic acid, and lactic acid.

14. The method for producing printed matter according to claim 13, wherein the organic acid comprises at least one acid selected from the group consisting of formic acid, acetic acid, oxalic acid, and ascorbic acid.

15. A method for producing printed matter, the method comprising:
applying a pretreatment liquid A comprising a resin and a pretreatment liquid B comprising a coagulant to a substrate, each using an inkjet system; and
after the applying of the pretreatment liquid A and the pretreatment liquid B, applying an aqueous inkjet ink to the substrate using an inkjet system,
wherein the resin of the pretreatment liquid A comprises a water-dispersible resin, the water-dispersible resin comprising at least one resin selected from the group consisting of a cationic water-dispersible resin and a nonionic water-dispersible resin, the pretreatment liquid A and the pretreatment liquid B are jetted so as to land on the substrate in a fixed order, and
for a first pretreatment liquid that lands on the substrate first between the pretreatment liquid A and the pretreatment liquid B, at least one time difference selected from the group consisting of a landing time difference $\Delta T_X$ between two dots that are arranged along a main scanning direction and for which a distance between the dots reaches a shortest value among any two dots arranged along the main scanning direction, and a landing time difference $\Delta T_Y$ between two dots that are arranged along a direction that intersects the main scanning direction and for which a distance between the dots reaches a shortest value among any two dots arranged along a direction that intersects the main scanning direction, is at least 10 ms.

16. The method for producing printed matter according to claim 15, wherein the water-dispersible resin comprises a nonionic water-dispersible resin.

17. A method for producing printed matter, the method comprising:
applying a pretreatment liquid P comprising a coagulant to a substrate;
after the applying of the pretreatment liquid P, applying a pretreatment liquid A comprising a resin and a pretreatment liquid B comprising a coagulant to the substrate, each using an inkjet system; and
after the applying of the pretreatment liquid A and the pretreatment liquid B, applying an aqueous inkjet ink to the substrate using an inkjet system,
wherein the pretreatment liquid A and the pretreatment liquid B are jetted so that the pretreatment liquid A lands on the substrate followed by the pretreatment liquid B, and
for the pretreatment liquid A that lands on the substrate before the pretreatment liquid B, at least one time difference selected from the group consisting of a landing time difference $\Delta T_X$ between two dots that are arranged along a main scanning direction and for which a distance between the dots reaches a shortest value among any two dots arranged along the main scanning direction, and a landing time difference $\Delta T_Y$ between two dots that are arranged along a direction that intersects the main scanning direction and for which a distance between the dots reaches a shortest value among any two dots arranged along a direction that intersects the main scanning direction, is at least 10 ms.

18. A method for producing printed matter, the method comprising:
applying a pretreatment liquid A comprising a resin and a pretreatment liquid B comprising a coagulant to a substrate, each using an inkjet system; and
after the applying of the pretreatment liquid A and the pretreatment liquid B, applying an aqueous inkjet ink to the substrate using an inkjet system,
wherein the pretreatment liquid A and the pretreatment liquid B are jetted so as to land on the substrate in a fixed order,
for a first pretreatment liquid that lands on the substrate first between the pretreatment liquid A and the pretreatment liquid B, at least one time difference selected from the group consisting of a landing time difference $\Delta T_X$ between two dots that are arranged along a main scanning direction and for which a distance between the dots reaches a shortest value among any two dots arranged along the main scanning direction, and a landing time difference $\Delta T_Y$ between two dots that are arranged along a direction that intersects the main scanning direction and for which a distance between the dots reaches a shortest value among any two dots arranged along a direction that intersects the main scanning direction, is at least 10 ms, and the inkjet system used for the applying of the pretreatment liquid A and the pretreatment liquid B is a serial-type inkjet system.

19. A method for producing printed matter, the method comprising:

applying a pretreatment liquid A comprising a resin and a pretreatment liquid B comprising a coagulant to a substrate, each using an inkjet system; and after the applying of the pretreatment liquid A and the pretreatment liquid B, applying an aqueous inkjet ink to the substrate using an inkjet system, wherein the pretreatment liquid A and the pretreatment liquid B are jetted so as to land on the substrate in a fixed order, for a first pretreatment liquid that lands on the substrate first between the pretreatment liquid A and the pretreatment liquid B, at least one time difference selected from the group consisting of a landing time difference $\Delta T_X$ between two dots that are arranged along a main scanning direction and for which a distance between the dots reaches a shortest value among any two dots arranged along the main scanning direction, and a landing time difference $\Delta T_Y$ between two dots that are arranged along a direction that intersects the main scanning direction and for which a distance between the dots reaches a shortest value among any two dots arranged along a direction that intersects the main scanning direction, is at least 10 ms, and jetting of a second pretreatment liquid between the pretreatment liquid A and the pretreatment liquid B that is jetted onto the substrate later, and jetting of the aqueous inkjet ink are each performed using a wet-on-wet method.

* * * * *